(12) United States Patent
Stafford

(10) Patent No.: US 8,733,764 B1
(45) Date of Patent: May 27, 2014

(54) MULTIPLE PIVOTED LATHE CHUCK JAW ASSEMBLY

(71) Applicant: Paul Eugene Stafford, Littleton, CO (US)

(72) Inventor: Paul Eugene Stafford, Littleton, CO (US)

( * ) Notice: Subject to any disclaimer, the term of this patent is extended or adjusted under 35 U.S.C. 154(b) by 0 days.

(21) Appl. No.: 14/070,575

(22) Filed: Nov. 3, 2013

Related U.S. Application Data

(60) Provisional application No. 61/722,153, filed on Nov. 3, 2012.

(51) Int. Cl.
*B23B 31/16* (2006.01)

(52) U.S. Cl.
USPC ......... 279/127; 279/2.01; 279/2.21; 279/110; 279/123

(58) Field of Classification Search
USPC .................. 279/2.01, 2.21, 110, 123, 127
IPC ........................................ B23B 31/16
See application file for complete search history.

(56) References Cited

U.S. PATENT DOCUMENTS

| | | | | |
|---|---|---|---|---|
| 1,161,490 A | * | 11/1915 | McKinney .................. | 279/123 |
| 1,348,740 A | * | 8/1920 | Reisinger ................... | 279/50 |
| 1,446,063 A | * | 2/1923 | Pratt ......................... | 279/118 |
| 2,722,427 A | * | 11/1955 | Labeyrie .................... | 279/119 |
| 2,736,563 A | * | 2/1956 | Work ......................... | 279/121 |
| 2,832,601 A | * | 4/1958 | Mann ......................... | 279/2.05 |
| 2,974,968 A | * | 3/1961 | Garrison .................... | 279/106 |
| 4,353,561 A | * | 10/1982 | Peterson .................... | 279/123 |
| 4,431,202 A | * | 2/1984 | Swenson ..................... | 279/106 |
| 4,558,876 A | * | 12/1985 | Call et al. .................. | 279/127 |
| 4,632,407 A | * | 12/1986 | Maxam et al. ............... | 279/121 |
| 8,152,175 B1 | * | 4/2012 | Maro et al. .................. | 279/123 |
| 8,578,588 B2 | * | 11/2013 | Karlein ...................... | 29/559 |

* cited by examiner

*Primary Examiner* — Eric A Gates

(57) ABSTRACT

A multiple pivoted lathe chuck jaw assembly utilizes a plurality of baseplates each having one or more sub-jaws pivotably attached thereto. Each baseplate is configured for attachment to, or is part of, the radially movable elements of a lathe chuck. Further, each baseplate has two pivotably attached sub-jaws. Each sub-jaw has two compression and two expansion workpiece gripping surfaces extending generally outwards from the front face of the baseplate: a first tier compression gripping surface, a second tier compression gripping surface, a first tier expansion gripping surface, and a second tier expansion gripping surface. The gripping surfaces each approximate a curved shape that matches the shape of a circle of a given radius allowing the sub-jaws to pivot and self-align to the workpiece surface for maximum surface contact and gripping force. Force-directed serrations can provide additional holding force toward the face of the chuck.

31 Claims, 22 Drawing Sheets

MULTIPLE PIVOTED LATHE CHUCK JAW ASSEMBLY

CROSS-REFERENCE TO RELATED APPLICATIONS

This application claims the benefit of U.S. Provisional Application No. 61/722,153 entitled MULTIPLE PIVOTED LATHE CHUCK JAW ASSEMBLY and filed on Nov. 3, 2012, which is specifically incorporated by reference herein for all that it discloses and teaches.

TECHNICAL FIELD

The present invention relates generally to the field of lathes; and more particularly, to a multiple pivoted lathe chuck jaw assembly that attaches to the radially movable elements in slots of scroll chucks for holding a workpiece in a lathe.

BACKGROUND

The field of art has known a number of different jaw designs. For example, the 29 Apr. 1980 saw the issuance of U.S. Pat. No. 4,200,300, which discloses the idea of utilizing a removable jaws. Twelve years later, U.S. Pat. No. 5,141,239 was issued on Aug. 25, 1992. This patent illustrates a jaw designed to grip a workpiece internally or externally within the extendable range of a scroll chuck. In 1995, this patent was improved upon by U.S. Pat. No. 5,464,231, in which curved engagement surfaces were added on the jaws. Although an improvement, the described jaws provide a maximum clamping surface contact area between the jaws and the workpiece when the chuck is positioned at its minimum diameter clamping range. As the chuck's clamping diameter is expanded, the surface contact area between the jaws and the workpiece actually decreases; thus, reducing the gripping force of the jaws on the workpiece as the workpiece diameter increases. Given a fixed rotation velocity, centrifugal forces on the surface of a rotating workpiece are greater on workpieces of larger diameter versus those of smaller diameter, yet the prior art described above reduces its gripping force as the workpiece diameter increases. What is needed is a jaw assembly that improves the gripping force on the workpiece as the chuck's clamping diameter is increased.

Additionally, the prior art contains jaws that are designed to function best as inner gripping expansion jaws, and others that work best as outer gripping compression jaws. It is difficult to perform both tasks well. Yet another limitation of current jaw designs is that they unduly limit the minimum and maximum diameter range of a given lathe chuck. What is needed is a jaw assembly that provides improved gripping forces for both expansion and compression arrangements while increasing the minimum to maximum diameter range of a chuck.

SUMMARY

One embodiment of the present invention comprises a jaw assembly utilizing a plurality of baseplates each having one or more sub-jaws pivotably attached thereto. Each baseplate is configured for attachment to the radially movable elements of a lathe chuck. In one configuration, a single baseplate has two pivotably attached sub-jaws. Each sub-jaw has two inner and two outer workpiece engagement surfaces, or gripping surfaces, extending generally perpendicular from the front face of the baseplate: a first tier compression gripping surface, a second tier compression gripping surface, a first tier expansion gripping surface, and a second tier expansion gripping surface. In other embodiments, additional gripping surfaces can be incorporated. The gripping surfaces each approximate a curved arc that matches the shape of a circle of a given radius (the radius is measured from the center axis of the chuck outwards). For example, when the chuck/sub-jaws are opened to their maximum extension range, the first tier expansion gripping surface is designed to hold a workpiece through expansion forces, and thus the radius of the workpiece's internal gripping surface is the same as that of the first tier expansion gripping surface of a sub-jaw at its maximum extension range. Similarly, when the chuck/sub jaws are adjusted to their midpoint setting, the first tier compression gripping surface of a sub-jaw is in contact with the external gripping surface of the workpiece, and the radius of the first tier compression gripping surface of the sub-jaw at its midpoint setting matches that of the external gripping surface of the workpiece.

When the chuck/sub-jaws are opened to their midpoint setting, the second tier expansion gripping surface is designed to hold a workpiece through expansion forces, and thus the radius of the workpiece's internal gripping surface is the same as that of the second tier expansion gripping surface of a sub-jaw at its mid-point setting. Similarly, when the chuck/sub-jaws are adjusted to their maximum extension range, the second tier compression gripping surface of a sub-jaw is in contact with the external gripping surface of the workpiece, and the radius of the second tier compression gripping surface of the sub-jaw at its maximum setting matches that of the external gripping surface of the workpiece. When the radii of the gripping surface of the workpiece and the gripping surface of a sub-jaw match, then the contact gripping area between the two is maximized.

The various radii of the gripping surfaces as described above provide the maximum average gripping area throughout the entire clamping range of the lathe chuck. Because the sub-jaws are pivotably mounted on the baseplate, they can swivel as necessary to bring the maximum amount of gripping surface area into contact with a given workpiece. Attachment between the sub-jaws and the baseplate can be via a self-locking hardware screw, a rivet holding hardware, or a similar structure that allows each sub-jaw to automatically pivot such that the force between the sub-jaw gripping surface and the workpiece is equally distributed across the mating surfaces and provides the maximum gripping force.

The sub-jaws can be made from any sufficiently hard material such as a metal, ceramic, etc. Additionally, when "soft jaws" are indicated, nylon or similar materials can be used instead. The gripping surfaces on the sub-jaws can contain serrated teeth and can have a dovetail/taper shape to obtain maximum gripping area with the workpiece. The serrations can be shaped to provide a force vector resulting from the chuck's gripping force upon the workpiece toward the face of the chuck to eliminate any forces away from the chuck and to help retain the workpiece securely within the sub-jaws. In applications where it is desirable to sacrifice gripping capability for minimal damage to workpiece surfaces from pressing the serrations into it, the dovetailed tapered surfaces may be smooth without serrations.

This invention can be readily manufactured without difficulty and is at least as easy to use as the prior art while incorporating increased versatility, efficacy and safety. The interface surface of all the radially movable elements in the industry can be readily matched by the jaw assembly interfacing surface making this invention universally usable. It is also possible that the pivoted jaws could be an integral part of the radially movable elements of any chuck.

BRIEF DESCRIPTION OF THE DRAWINGS

The aforementioned and other features and objects of the present invention and the manner of attaining them will become more apparent and the invention itself will be best understood by reference to the following descriptions of a preferred embodiment and other embodiments taken in conjunction with the accompanying drawings, wherein.

DETAILED DESCRIPTION

Figure 1:
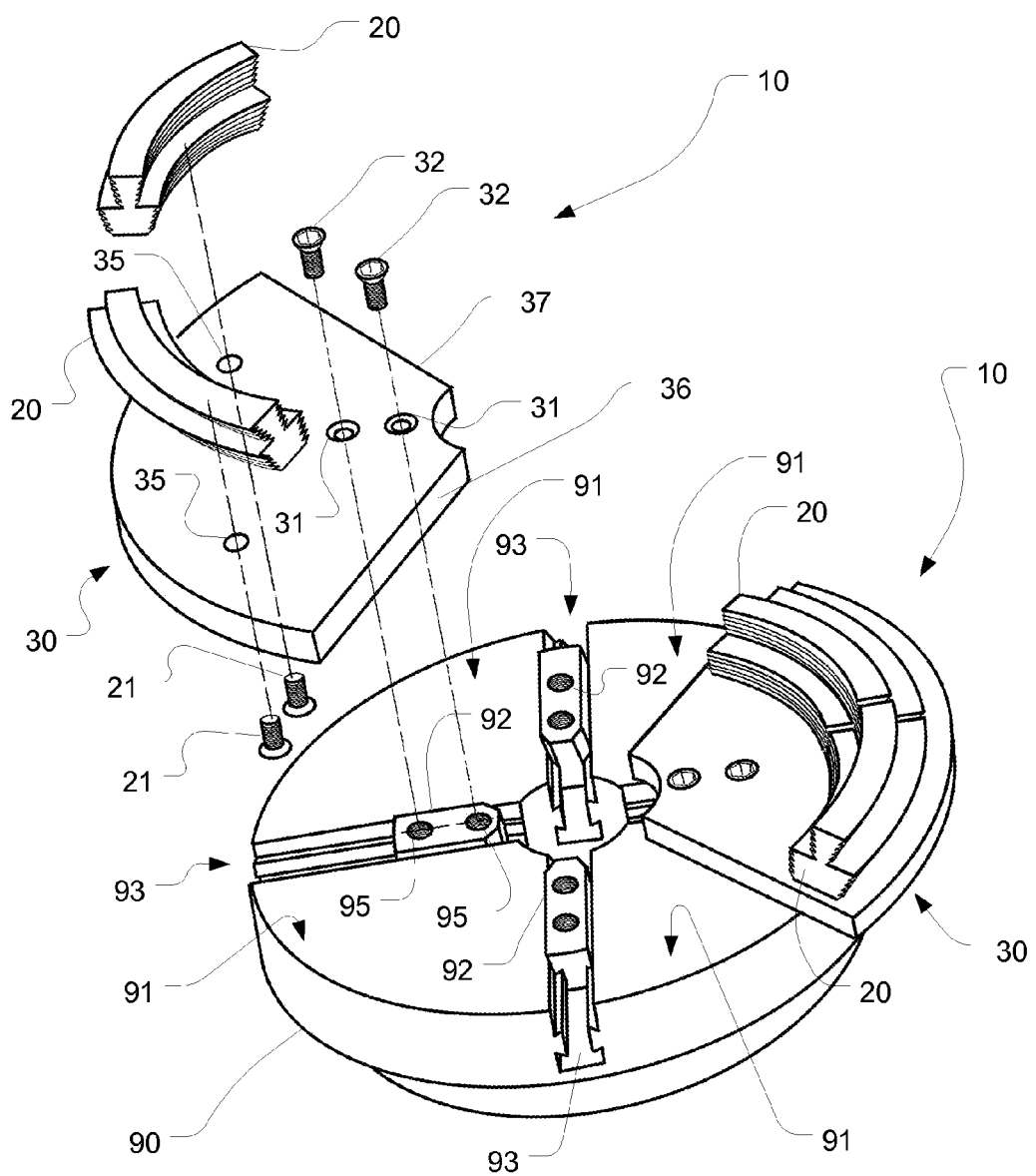
FIG. 1 shows an exploded, top perspective view of an exemplary embodiment of a multiple pivoted lathe chuck jaw assembly.

Referring now to the drawings, FIG. 1 illustrates an exploded, top perspective view of an exemplary embodiment of a multiple pivoted lathe chuck jaw assembly 10. A typical lathe chuck 90 is shown below the exploded view of a jaw assembly 10. In position on the lathe chuck 90 is a second jaw assembly 10. The lathe chuck 90 is capable of radially expanding and contracting four separate jaw assemblies 10 (only two are shown in FIG. 1, see FIG. 12 for an illustration of an embodiment showing four jaw assemblies 10). The chuck 90 is able to accomplish this via its four radially movable elements 92. These elements 92 extend radially outwards and contract inwards, each along its own track 93 in the chuck. When the radially movable elements 92 are fully contracted inwards, they are said to be at a minimum expansion point. When the radially movable elements 92 are fully expanded outwards, they are said to be at a maximum expansion point. And when the radially movable elements are halfway between the minimum and maximum expansion points, they are said to be at a midway expansion point. The radially movable elements 92 of the lathe chuck 90 each have a jaw assembly attachment that secures an individual multiple pivoted lathe chuck jaw assembly 10 to each radially movable element 92.

In the embodiment shown in FIG. 1, the jaw assembly attachment comprises two baseplate attachment holes 31 in the baseplate 30, and two baseplate attachment screws 32 that are placed through the baseplate attachment holes 31 and thread into the two radial movable element screw holes 95. In other embodiments, the jaw assembly attachment can comprise other attachment means, including being integrally formed or otherwise permanently affixing each baseplate 30 to its corresponding radially moveable element 92. Once the baseplates 30 are secured to the radially movable elements 92, then the lathe chuck 90 can be adjusted such that the radially movable elements 92 extend radially outwards. This action then causes the jaw assemblies 10 to also move outwards. Similarly, if the chuck 90 is adjusted such that the radially movable elements 92 are retracted radially inwards, the jaw assemblies 10 will also move inwards. In the embodiment shown in FIG. 1, the baseplate attachment screws 32 can be self-locking screws that will not vibrate loose once tightened into place. In other embodiments, other means of attaching the jaw assemblies 10 to the radially movable elements 92 are contemplated.

The plurality of baseplates 30 is illustrated in the embodiment in FIG. 1 as being approximately the shape of a pie-piece, with four pieces (here, four baseplates 30, although only two are shown in FIG. 1, see FIG. 11) forming a full pie or circle. As illustrated in FIG. 1, each baseplate 30 has a left edge 36 and a right edge 37. Although not highlighted in FIG. 1, each baseplate 30 also has a front face 38 and a rear face 39 (see FIG. 3). One advantage of the baseplates 30 of the present invention is that they can be configured to extend out beyond the outer perimeter of the chuck 90, thereby allowing the sub-jaws 20 to extend out beyond the perimeter of the chuck 90 as well. This allows a plurality of jaw assemblies 10 to receive and hold workpieces that have diameters greater than that of the chuck 90. In the embodiment shown in FIG. 1, each baseplate 30 is configured with two pivotably attached sub-jaws 20.

Each sub-jaw 20 is pivotably attached to its baseplate 30. In one embodiment, a high strength steel self-locking flathead pivot screw 21 can be used to attach each sub-jaw 20 to its baseplate 30 at a pivoting attachment point 35. A plurality of pivoting attachment points 35 are illustrated in FIG. 1. The pivoting attachment point 35 is a countersunk sub-jaw attachment hole, in the embodiment shown in FIG. 1. Each pivot screw 21 attaches through its baseplate 30 and up into an associated blind attachment hole (see FIG. 5, item 29) in its sub-jaw 20. An example of a self locking pivot screw 21 available in the industry would be one that obtains locking action from a plastic pellet compressed into a hole drilled in the lower area of the screw's threaded region or a polyester patch bonded to the threads. In other embodiments, other types of pivot screws 21 can be utilized. In yet other embodiments, other types of pivoting sub-jaw attachments means are contemplated in place of the pivot screw 21 and associated components.

In the embodiment illustrated in FIG. 1, the pivot screw 21 is torqued into the sub-jaw 20 such that the sub-jaw 20 is somewhat snug against its baseplate 30, yet is free to pivot about the pivot screw 21 at the pivoting attachment point 35 when force is applied by the chuck forcing the sub-jaw 20 against a workpiece. The head of the pivot screws 21 should be flush with the rear surface of baseplate 30 after attachment so that they do not contact the chuck face 91. In one embodiment, the sub-jaws 20 may rotate less than three degrees between the minimum and maximum chuck expansion range.

The jaw assemblies 10 are designed to grip a workpiece inside a recess in the workpiece (i.e., internally) or around the periphery of the workpiece (i.e., externally). The sub-jaws 20 provide the gripping surfaces that contact the workpiece and thus should be made from a sufficiently hard material such as a metal, ceramic, etc. However, as noted above, when "soft jaws" are indicated, the sub-jaws 20 can be made from nylon or other "soft" materials. The gripping surfaces on the sub-jaws 20 can contain serrated teeth and can have a dovetail/taper shape to obtain maximum gripping surface area with the workpiece and help to direct the forces against the workpiece to maximize the holding potential of the jaw assemblies 10. Exemplary embodiments of these gripping surfaces and serrations are illustrated in FIG. 1; however, see FIGS. 5-7 and 9A for more detail. The serrations can be shaped to provide a force vector resulting from the chuck's gripping force upon the workpiece toward the chuck face 91 to eliminate any forces away from the chuck face 91 and to help retain the workpiece securely within the sub-jaws 20. In applications where it is desirable to sacrifice gripping capability for minimal damage to workpiece surfaces from pressing the serrations into the workpiece, the dovetailed tapered surfaces may be smooth and without serrations. In yet other embodiments, the gripping surfaces can be flat and without a dovetail taper.

Figure 2:
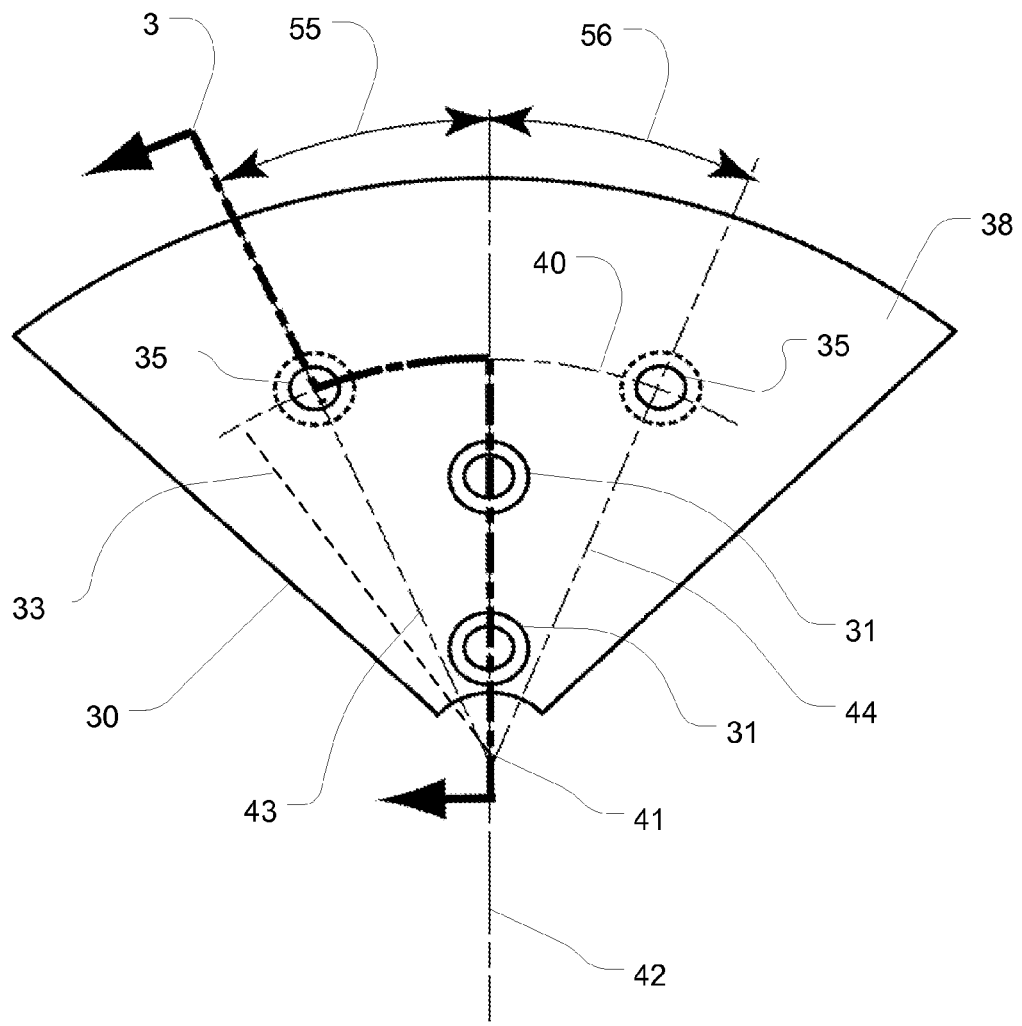
FIG. 2 illustrates a top plan view of a baseplate component of an exemplary embodiment of a multiple pivoted lathe chuck jaw assembly.

FIG. 2 illustrates a top plan view of a baseplate component 30 of an exemplary embodiment of a multiple pivoted lathe chuck jaw assembly. The baseplate attachment holes 31 are shown as are the sub-jaw attachment holes, which comprise the pivoting attachment points 35. As shown in FIG. 2, the baseplate attachment holes 31 can be countersunk so as to maintain a clean, flat surface on the front face 38 of the baseplate 30. The sub-jaw attachment holes 35 can also be countersunk (shown in FIG. 2 as broken line circles since the counter-sinking would be done on the rear face of the baseplate 30) so as to minimize any unwanted contact between the jaw assembly and the chuck face 91.

As mentioned above, the radially movable elements 92 of the lathe chuck 90 each two radial movable element screw holes 95 that are used by the jaw assembly attachment to secure an individual multiple pivoted lathe chuck jaw assembly 10 to each radially movable element 92. In other embodiments, the radially movable elements 92 of a chuck 90 may have more or fewer screw holes 95. As previously described, the jaw assembly attachment may utilize the screw holes 95 or may attach the baseplate 30 to the radially movable elements 92 in some other way. In the embodiment shown in FIG. 2, the chuck to which the baseplate 30 is to be attached, is configured with four radially movable elements 92 (see FIG. 1), since the baseplate 30 shown in FIG. 2 comprises approximately a quarter circle. The location and quantity of the baseplate attachment holes 31 are each dependent upon the configuration of the chuck with which a given baseplate 30 is intended to mate. For example, if the radially movable elements of a chuck each have three threaded holes then the jaw assembly attachment for a corresponding baseplate should have three baseplate attachment holes 31 and three baseplate attachment screws 32 of the correct size to be compatible. Different manufactures create surface features on their radially movable elements including different mounting hole spaces and screw threads. The rear face of the baseplate 30 that attaches to the radially movable elements can be constructed to be compatible with the radially movable elements of specific chucks.

In a baseplate 30 used with two sub-jaws 20 there can be two countersunk (on the rear face) sub-jaw attachment holes 35 used by the pivot screws 21 (which can be self locking flathead screws) to attach the sub-jaws 20 to the front face of the baseplate 30. One pivot screw 21 per sub-jaw 20 is used as a pivot post. The sub-jaw attachment holes 35 are located on a pivoting attachment point arc 40 which is positioned via a pivoting attachment point radius 33 that extends from the chuck's center axis 41 while at the minimum of its expansion range to the pivoting attachment point arc 40. This represents a configuration where the sub-jaws 20 would be attached to the baseplate 30 above the baseplate attachment holes 31 used to attach the baseplate 30 to the radially movable elements of the chuck.

As the embodiment in FIG. 2 utilizes two sub-jaws 20 per baseplate 30, there are two sub-jaw attachment holes 35, one for each sub-jaw 20. The center line 42 of the baseplate 30 is illustrated by the broken line extending vertically in FIG. 2 from the narrow inner edge of the baseplate 30 to its outer perimeter. The sub-jaw attachment hole lines 43 and 44 extend from the chuck's center axis 41 and radiate outwards, passing through the center of the sub-jaw attachment holes 35. The double-arrow angle indicator 55 spans the angle between the center line 42 and the first sub-jaw attachment hole line 43. For a one-quarter circle baseplate 30 utilizing two sub-jaws, a desirable measurement for angle indicator 55 is approximately 22.5 degrees. Similarly, the double-arrow angle indicator 56 spans the angle between the center line 42 and the second sub-jaw attachment hole line 44. The measurement of angle indicator 56 can be a mirror of angle indicator 55; in this case, 22.5 degrees. For a one-third circle baseplate 30 (see FIG. 12 for an example), utilizing two sub-jaws, a desirable measurement for angle indicators 55 and 56 can be thirty degrees.

Also shown in FIG. 2 is a bold, broken line cross-sectional arrow 3. This broken line 3 indicates where the cross-section illustrated in FIG. 3 is taken from on the baseplate 30 in FIG. 2.

The baseplate 30 can be made from hardened metal, ceramic, etc. for strength and to reduce the potential for wear. Other materials may be used as needed. The baseplate's 30 upper outer edge can have a radius larger than the outer radius of the attached sub-jaws 20 (measured from the chuck's center axis 41), see also FIG. 1. The advantage to this design is that even when the workpiece is being gripped in an expansion mode, at least a portion of the workpiece remains in contact with the front face 38 of the baseplate 30 from which it receives physical support and restraint.

Figure 3:
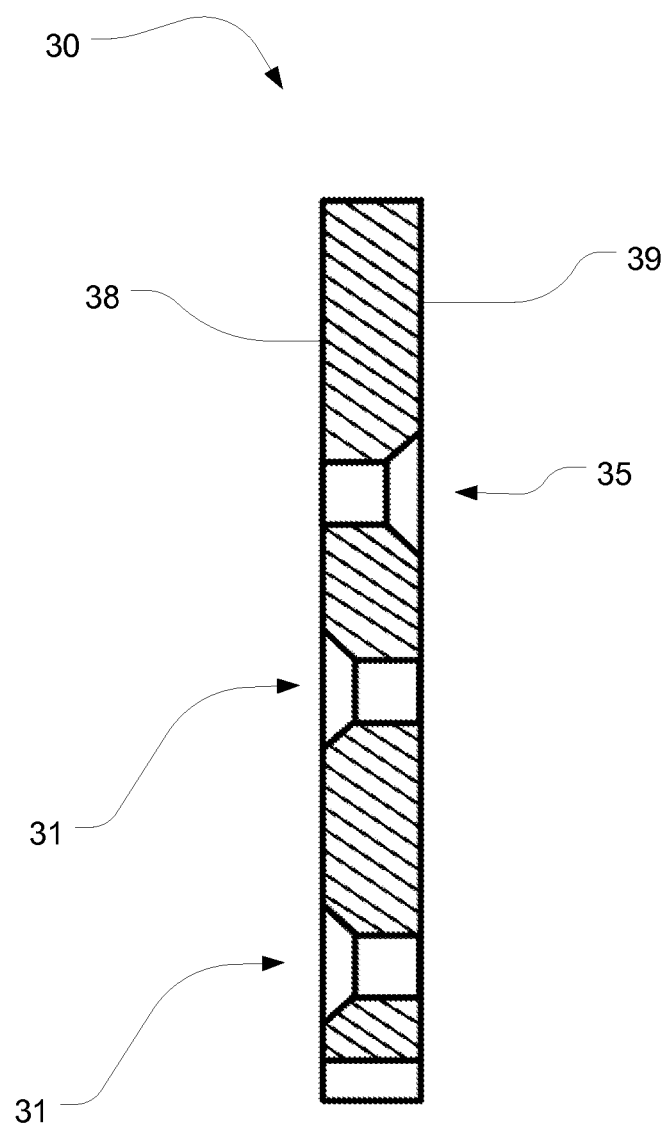
FIG. 3 illustrates a side, cross-section view of a baseplate component of an exemplary embodiment of a multiple pivoted lathe chuck jaw assembly.

FIG. 3 illustrates a side, cross-section view of a baseplate 30 component of an exemplary embodiment of a multiple pivoted lathe chuck jaw assembly. The baseplate 30 is shown in cross-section, see FIG. 2, item 3 for the reference line along which the cross section is taken. Note that the front face 38 of the baseplate 30 contains the countersunk openings of the baseplate attachment holes 31 and the rear face 39 of the baseplate 30 contains the countersunk openings of the sub-jaw attachment holes 35 (although only one of two is visible in FIG. 3).

Figure 4:
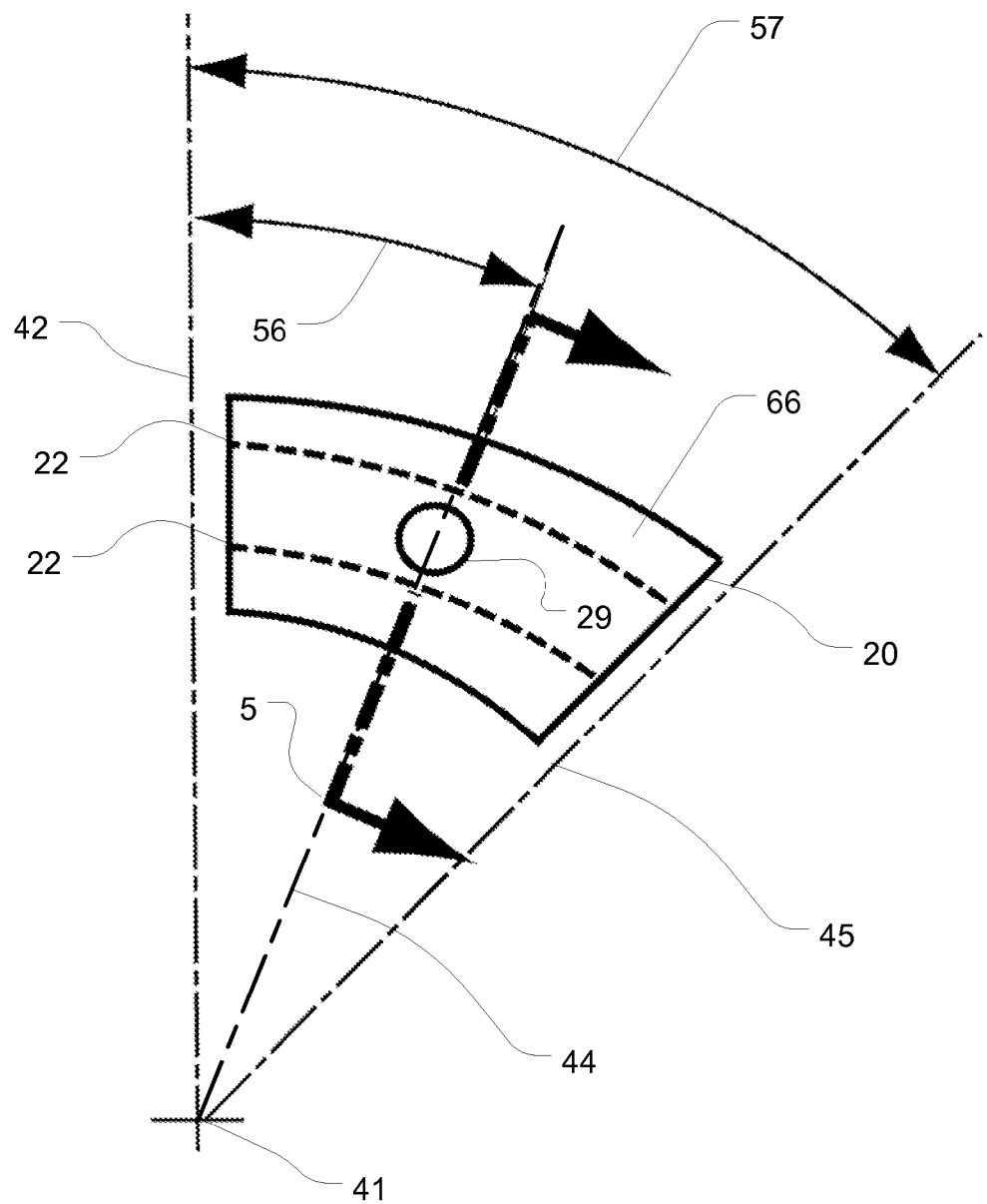
FIG. 4 illustrates a bottom plan view of a sub-jaw component of an exemplary embodiment of a multiple pivoted lathe chuck jaw assembly.

FIG. 4 illustrates a bottom plan view of a sub-jaw 20 component of an exemplary embodiment of a multiple pivoted lathe chuck jaw assembly. The sub-jaw 20 can utilize a blind attachment hole 29 for attachment of the pivot screw 21 (see FIG. 1) to attach the sub-jaw 20 to the front face of the baseplate 30. When utilizing this sub-jaw attachment means, the blind attachment hole 29 should be tapped to match the threads of the pivot screws 21. The sub-jaws 20, which are attached to the baseplate 30, are mirror images of one another. The broken line arcs 22 shown on the sub-jaw 20 represent the second tier of gripping surfaces on the top of the sub-jaw 20 (see FIG. 5 for more detail). The blind attachment hole 29 is located approximately in the center of the sub-jaw 20 on a broken line that represents the sub-jaw attachment hole line 44 extending radially outwards from the chuck's center axis 41. As this sub-jaw 20 is one of a pair of sub-jaws present on a single baseplate 30 (see FIG. 1) on a chuck having four radially movable elements 92 spaced at ninety degrees, then the sub-jaw 20 is one of eight sub-jaws that may be present on the chuck 90. The center line 42 of the baseplate 30 is illustrated by the broken line extending vertically in FIG. 4 radially outwards from the center axis 41 of the chuck 90.

The double-arrow angle indicator 56 spans the angle between the center line 42 and the sub-jaw attachment hole line 44. For a quarter circle baseplate 30 utilizing two sub-jaws, a desirable measurement for angle indicator 56 is approximately 22.5 degrees. The broken line representing one of the quarter circle delineator lines 45 is one of four such lines that can be conceived extending radially outwards from the center axis 41 of the chuck 90. These lines separate the circle defined by the outer perimeter of the chuck 90 into four equal quarters. It is at these quarter circle delineator lines 45 that the four baseplates 30 in this embodiment abut one another when the chuck's radially movable elements 92 are retracted radially inwards to their minimum configuration. The double-arrow angle indicator 57 spans the angle between the center line 42 and the shown quarter circle delineator line 45. The measurement of angle indicator 57 is preferably 45 degrees. Note the spaces between the straight edged sides of the sub-jaw 20 and the two lines 42 and 45. These spaces are necessary to accommodate the corners of the sub-jaw 20 as it pivots around the pivot screw 21 within the blind attachment hole 29.

Figure 5:
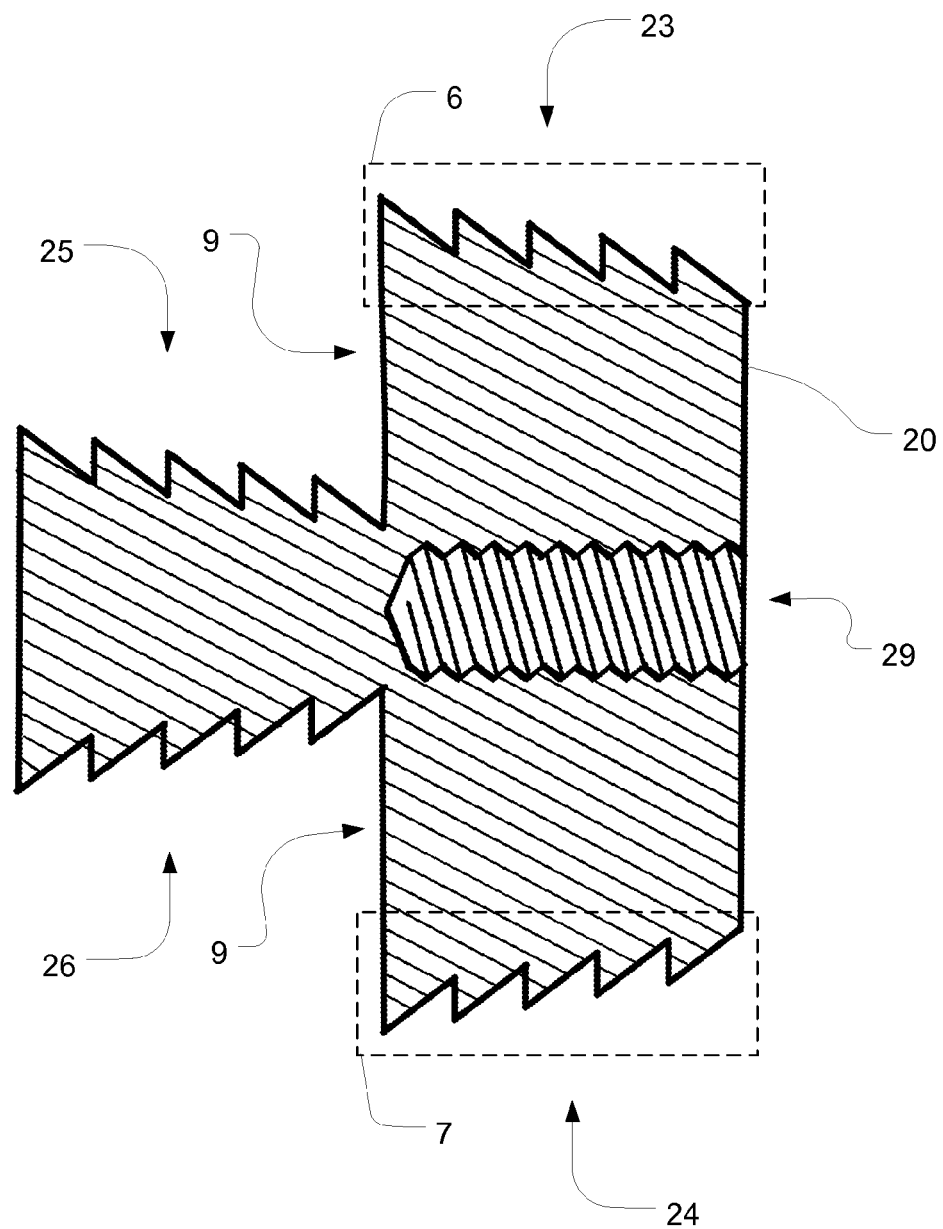
FIG. 5 illustrates a side, cross-section view of a sub-jaw component of an exemplary embodiment of a multiple pivoted lathe chuck jaw assembly.

Also shown in FIG. 4 is a bold, broken line cross-sectional arrow 5. This broken line 5 indicates where the cross-section illustrated in FIG. 5 is taken from on the sub-jaw 20 in FIG. 4. Additionally, since the view in FIG. 4 is a bottom plan view, the sub-jaw bottom surface 66 is visible.

The sub-jaw 20 can be made from hardened metal, ceramic, etc. for strength and to reduce the potential for wear. As described above, in cases were a "soft jaw" is needed, the sub-jaws 20 can be made from nylon or other similarly "soft" materials. Although not shown in FIG. 4, the gripping surfaces of the sub-jaw 20 contact and secure the workpiece within the jaw assemblies 10 and hence the chuck (see FIG. 5).

FIG. 5 illustrates a side, cross-section view of a sub-jaw 20 component of an exemplary embodiment of a multiple pivoted lathe chuck jaw assembly. The cross-section of the sub-jaw 20 is taken along the broken line cross-sectional arrow 5 from FIG. 4 passing through the center of the sub-jaw 20. The drilled and tapped blind attachment hole 29 is shown; the pivot screw 21 mounts here and thereby pivotably attaches the sub-jaw 20 to the baseplate 30. Other pivotable attachment means are contemplated. The other main features visible in FIG. 5 are the sub-jaw gripping surfaces, comprising: the first tier expansion gripping surface 23, the first tier compression gripping surface 24, the second tier expansion gripping surface 25, and the second tier compression gripping surface 26. The first tier expansion and compression gripping surfaces 23 and 24 are located on the first tier of the sub-jaw 20, with the first tier expansion gripping surface 23 located along the outer edge of the sub-jaw 20 while the first tier compression gripping surface 24 is located along the inner edge of the sub-jaw 20. Similarly, the second tier expansion and compression gripping surfaces 25 and 26 are located on the second tier of the sub-jaw 20, with the second tier expansion gripping surface 25 located along the outer edge of the sub-jaw 20 while the second tier compression gripping surface 26 is located along the inner edge of the sub-jaw 20.

All four of the sub-jaw gripping surfaces 23, 24, 25, and 26 can have the force-directed serrations 6 and 7 as shown in FIG. 5. In other embodiments, the gripping surfaces may be smooth or have other types of surface contours. Additionally, all four of the sub-jaw gripping surfaces 23, 24, 25, and 26 can have the dovetailed/tapered shape shown in FIG. 5. In other embodiments, the gripping surfaces may be straight (or horizontal if illustrated as in FIG. 5), or have other shapes as known in the art. The top surface 9 of the first tier is labeled in FIG. 5.

The force-directed serrations 6 and 7 are shaped so as to maximize the amount of compression or expansion force that is re-directed to help hold the workpiece onto the front face 38 of the baseplate 30. See FIGS. 6 and 7 for more information about the force-directed serrations 6 and 7.

Figure 6:
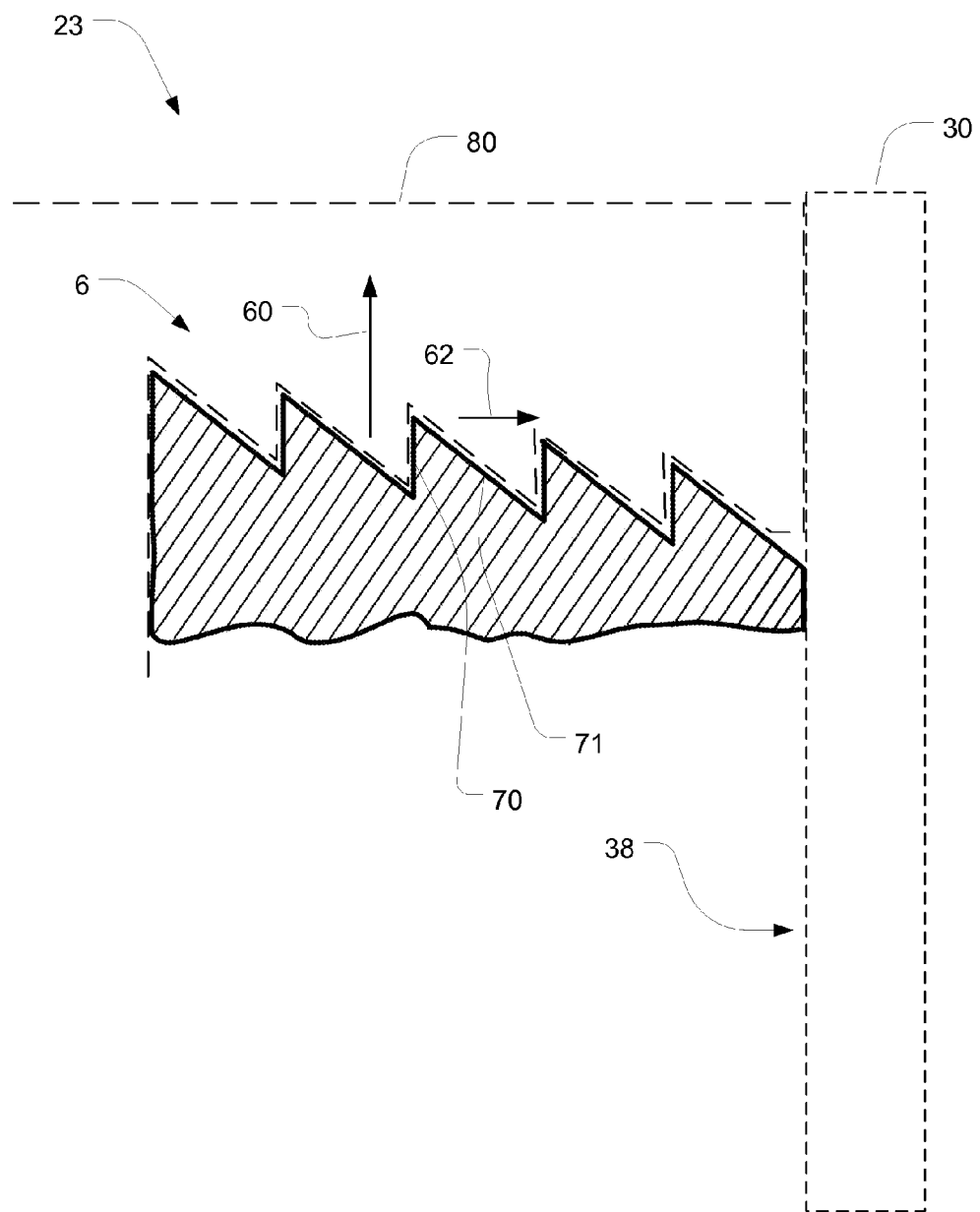
FIG. 6 illustrates a close-up, side, cross-section view of the first tier expansion gripping surface of a sub-jaw component of an exemplary embodiment of a multiple pivoted lathe chuck jaw assembly.

FIG. 6 illustrates a close-up, side, cross-section view of the first tier expansion gripping surface 23 of a sub-jaw component 20 of an exemplary embodiment of a multiple pivoted lathe chuck jaw assembly. The gripping surface shown in FIG. 6 is the first tier expansion gripping surface 23. This means that the sub-jaw 20 is expanded radially outwards from the center axis 41 of the chuck 90 in order to tighten the first tier expansion gripping surface 23 of the sub-jaw 20 against the workpiece 80. The radial expansion force is represented by the radial expansion force arrow 60. The force-directed serrations 6 can be shaped so as to maximize the amount of the radial expansion force that is re-directed at a right angle towards the baseplate 30. Because of the angled shape of the force-directed serrations 6, a portion of the expansion force 60, shown in FIG. 6 as holding force arrow 62, is redirected to push the workpiece 80 against the baseplate 30. The holding force 62 helps to hold the workpiece 80 tightly against the front face 38 of the baseplate 30 so that the workpiece can be safely worked on the lathe. In order to generate holding force 62, the force-directed serrations 6 should have a vertical extension tooth wall 70 and an angled tooth wall 71; wherein the angled tooth wall 71 is angled towards the baseplate 30. Note that the above descriptions also hold for the second tier expansion gripping surface 25 except that the workpiece 80 is pressed against the top surface 9 of the first tier of the sub-jaw 20 instead of or in addition to the baseplate 30.

Figure 7:
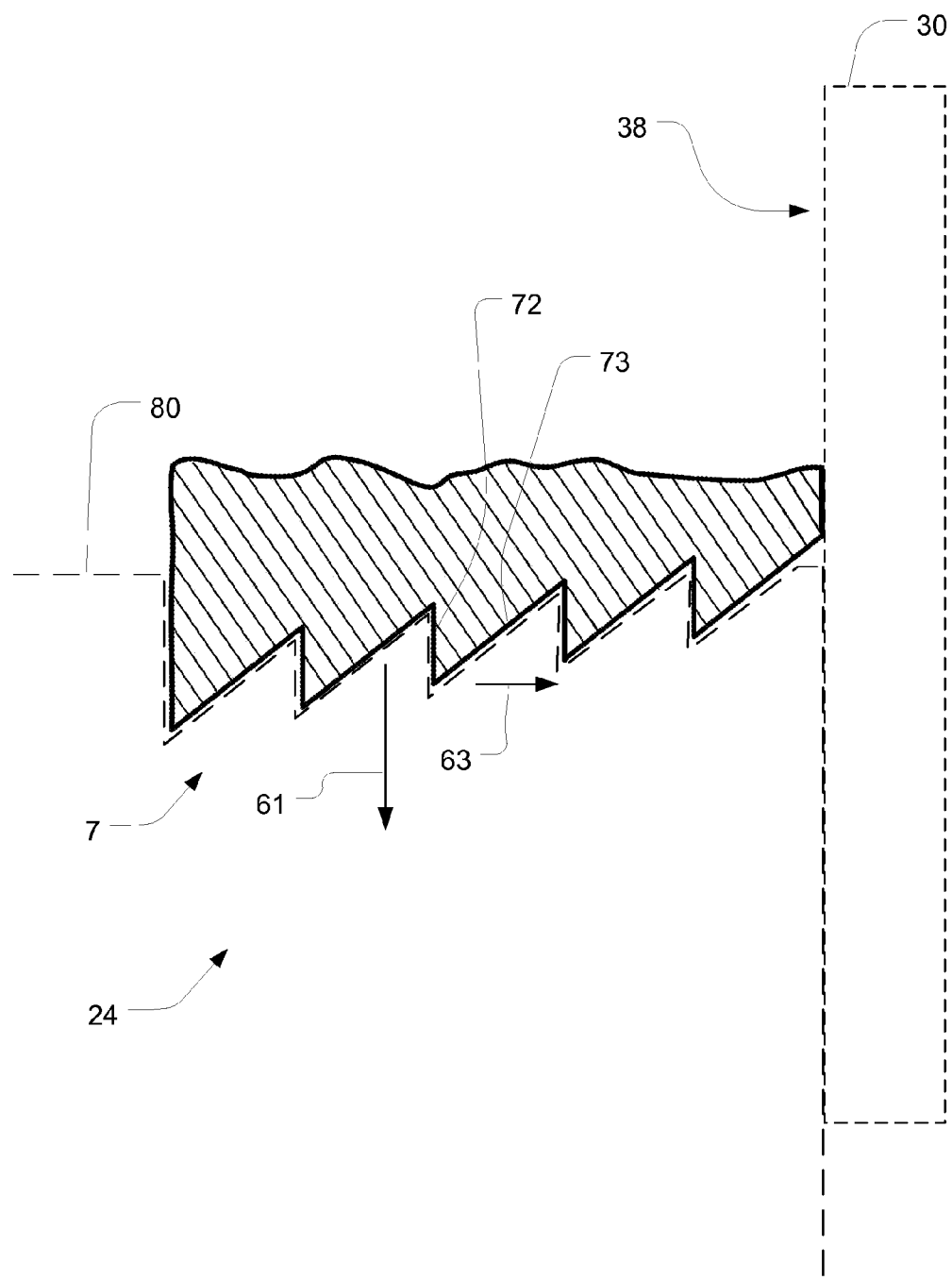
FIG. 7 illustrates a close-up, side, cross-section view of the first tier compression gripping surface of a sub-jaw component of an exemplary embodiment of a multiple pivoted lathe chuck jaw assembly.

FIG. 7 illustrates a close-up, side, cross-section view of the first tier compression gripping surface 24 of a sub-jaw component 20 of an exemplary embodiment of a multiple pivoted lathe chuck jaw assembly. The gripping surface shown in FIG. 7 is the first tier compression gripping surface 24. This means that the sub-jaw 20 is compressed radially inwards towards the center axis 41 of the chuck 90 in order to tighten the sub-jaw 20 against the workpiece 80. The radial compression force is represented by the radial compression force arrow 61. The force-directed serrations 7 can be shaped so as to maximize the amount of the radial compression force that is re-directed at a right angle towards the baseplate 30. Because of the angled shape of the force-directed serrations 7, a portion of the expansion force 61, shown in FIG. 7 as holding force arrow 63, is redirected to push the workpiece 80 against the baseplate 30. The holding force 63 helps to hold the workpiece 80 tightly against the front face 38 of the baseplate 30 so that the workpiece can be safely worked on the lathe. In order to generate holding force 63, the force-directed serrations 7 should have a vertical extension tooth wall 72 and an angled tooth wall 73; wherein the angled tooth wall 73 is angled towards the baseplate 30. Note that the above descriptions also hold for the second tier compression gripping surface 26 except that the workpiece 80 is pressed against the top surface 9 of the first tier of the sub-jaw 20 instead of or in addition to the baseplate 30.

Figure 8A:
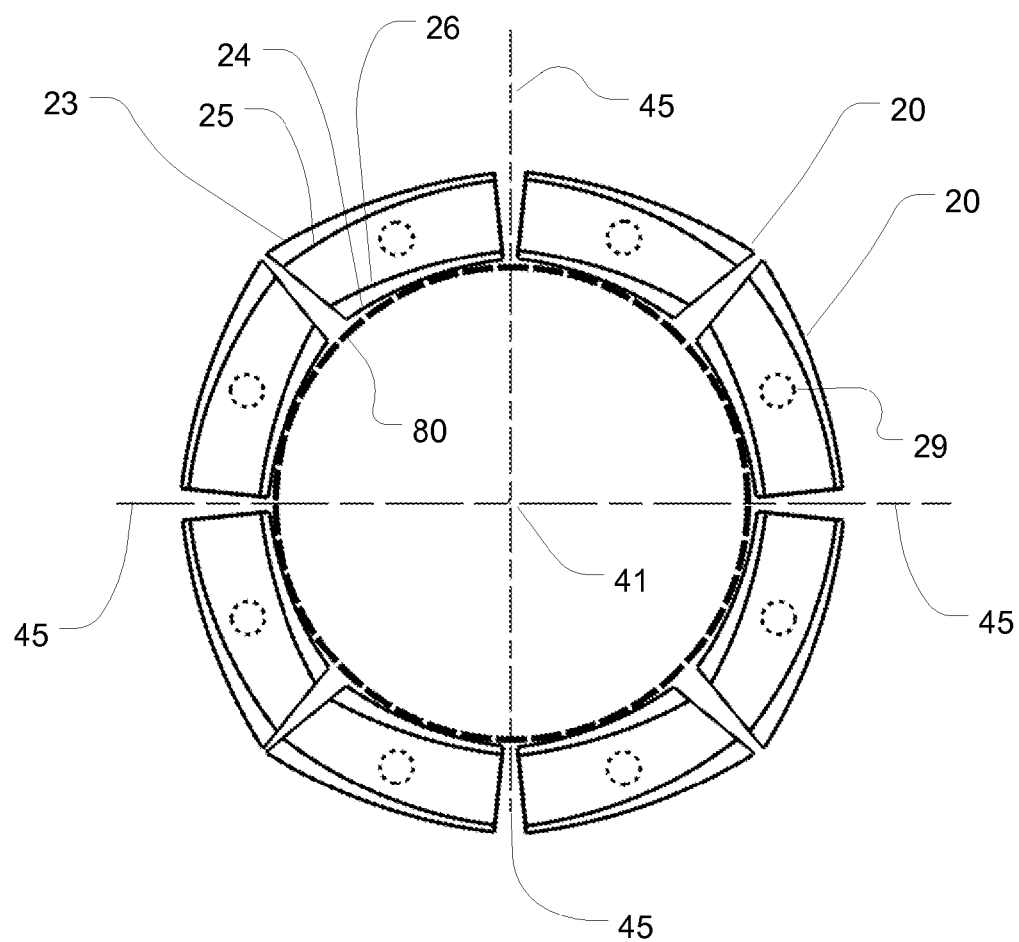
FIG. 8A illustrates a top plan view of an exemplary embodiment of a multiple pivoted lathe chuck jaw assembly compressing a minimum diameter workpiece.

FIG. 8A illustrates a top plan view of an exemplary embodiment of a multiple pivoted lathe chuck jaw assembly compressing a minimum diameter workpiece 80. The chuck, movable elements, and baseplates are not shown in FIG. 8A; see FIG. 1 for clarity. The location of the outer perimeter of the workpiece 80 is shown in broken lines as the workpiece would block the view of the sub-jaws 20 if shown in its entirety. Note that the chuck not shown in the embodiment illustrated in FIG. 8A would have four radially moveable elements, each attaching to one of four baseplates. The four-quarter circle delineator lines 45 are all present in FIG. 8A—they delineate the four baseplates, one from another. Note that the baseplates are in their minimum radius configuration in the embodiment shown in FIG. 8A, i.e., the radially movable elements are retracted as far towards the center axis 41 of the chuck as possible in order for the sub-jaws 20 to engage a workpiece having a minimum diameter.

The sub-jaws 20 shown in FIG. 8A include one pair of sub-jaws 20 per baseplate; eight sub-jaws 20 total. Each sub-jaw 20 is shown with a broken line representation of the blind attachment hole 29. Importantly, each sub-jaw 20 is also shown with its four gripping surfaces. Arrayed from inner to outer location, they are: the first tier compression gripping surface 24, the second tier compression gripping surface 26, the second tier expansion gripping surface 25 and the first tier expansion gripping surface 23.

Note the contact area between the outer perimeter of the workpiece 80 and the first tier compression gripping surfaces 24 of the sub-jaws 20. A portion of the first tier compression gripping surfaces 24 are not in contact with the workpiece 80. This is because the multiple pivoted lathe chuck jaw assembly is optimized to provide maximum contact area between the sub-jaws and the workpiece (and thus, maximum gripping force on the workpiece) at the mid-point and maximum locations of the radially moveable elements 92 of the chuck (i.e., with workpieces that have either a mid-point perimeter radius or a maximum perimeter radius, not a minimum perimeter radius, as the workpiece 80 in FIG. 8A has). Critically, the fact that the sub-jaws 20 are each pivotably attached to the baseplate allows the sub-jaws 20 to automatically pivot as necessary so that the optimal gripping locations can contact the workpiece 80 as the chuck is tightened.

Figure 8B:
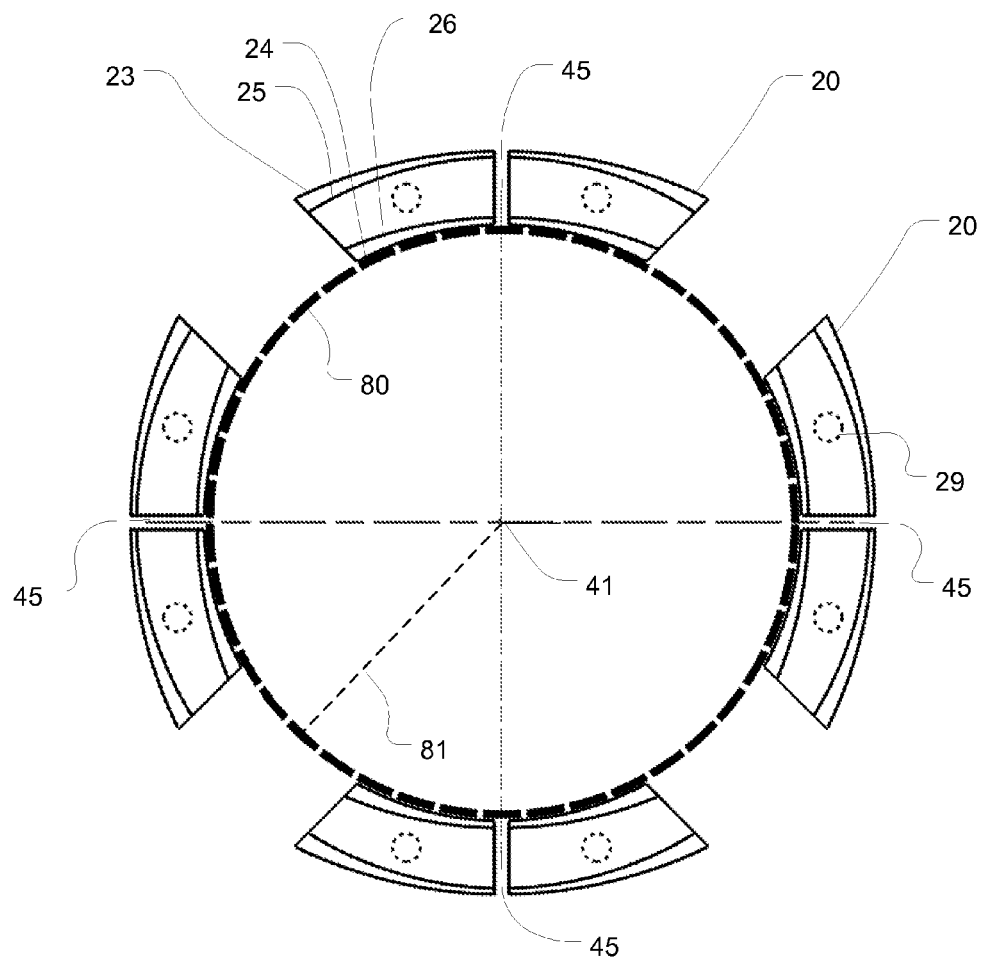
FIG. 8B illustrates a top plan view of an exemplary embodiment of a multiple pivoted lathe chuck jaw assembly compressing a midpoint diameter workpiece.

FIG. 8B illustrates a top plan view of an exemplary embodiment of a multiple pivoted lathe chuck jaw assembly compressing a midpoint diameter workpiece 80. The chuck, movable elements, and baseplates are not shown in FIG. 8B, see FIG. 1. The location of the outer perimeter of the workpiece 80 is shown in broken lines as the workpiece would block the view of the sub-jaws 20 if shown in its entirety. Note that the chuck not shown in the embodiment illustrated in FIG. 8B would have four radially moveable elements, each attaching to one of four baseplates. The four quarter circle delineator lines 45 are all present in FIG. 8B—they delineate the four baseplates, one from another. Note that the baseplates are in their mid-point radius configuration in the embodiment shown in FIG. 8B, i.e., the radially movable elements are expanded halfway outwards from the center axis 41 of the chuck in order for the sub-jaws 20 to engage a workpiece having a mid-point radius.

The sub-jaws 20 shown in FIG. 8B include one pair of sub-jaws 20 per baseplate; eight sub-jaws 20 total. Each sub-jaw 20 is shown with a broken line representation of the blind attachment hole 29. Importantly, each sub-jaw 20 is also shown with its four gripping surfaces. Arrayed from inner to outer location, they are: the first tier compression gripping surface 24, the second tier compression gripping surface 26, the second tier expansion gripping surface 25 and the first tier expansion gripping surface 23.

Note the contact area between the outer perimeter of the workpiece 80 and the first tier compression gripping surfaces 24 of the sub-jaws 20. The entirety of the first tier compression gripping surfaces 24 are in contact with the workpiece 80. This is because the multiple pivoted lathe chuck jaw assembly is optimized to provide maximum contact area between the sub-jaws and the workpiece (and thus, maximum gripping force on the workpiece) at the mid-point and maximum locations of the radially moveable elements 92 of the chuck (i.e., with workpieces that have either a mid-point perimeter radius or a maximum perimeter radius). As the workpiece in FIG. 8B has a mid-point perimeter radius, the first tier compression gripping surfaces 24, which also have a mid-point perimeter radius, exactly match the curve of the workpiece and the contact area is maximized. Critically, the fact that the sub-jaws 20 are each pivotably attached to the baseplate allows the sub-jaws 20 to automatically pivot as necessary so that the full gripping surface can contact the workpiece 80 as the chuck is tightened.

The broken line representing the workpiece 80 in FIG. 8B also defines the location of a first tier compression gripping surface arc which is fixed by the length of the first inner radius 81 which is measured from the central axis to the first tier compression gripping surfaces 24 on the sub-jaws 20 when the radially movable elements are positioned at the midway expansion point, as they are in FIG. 8B.

Figure 8C:
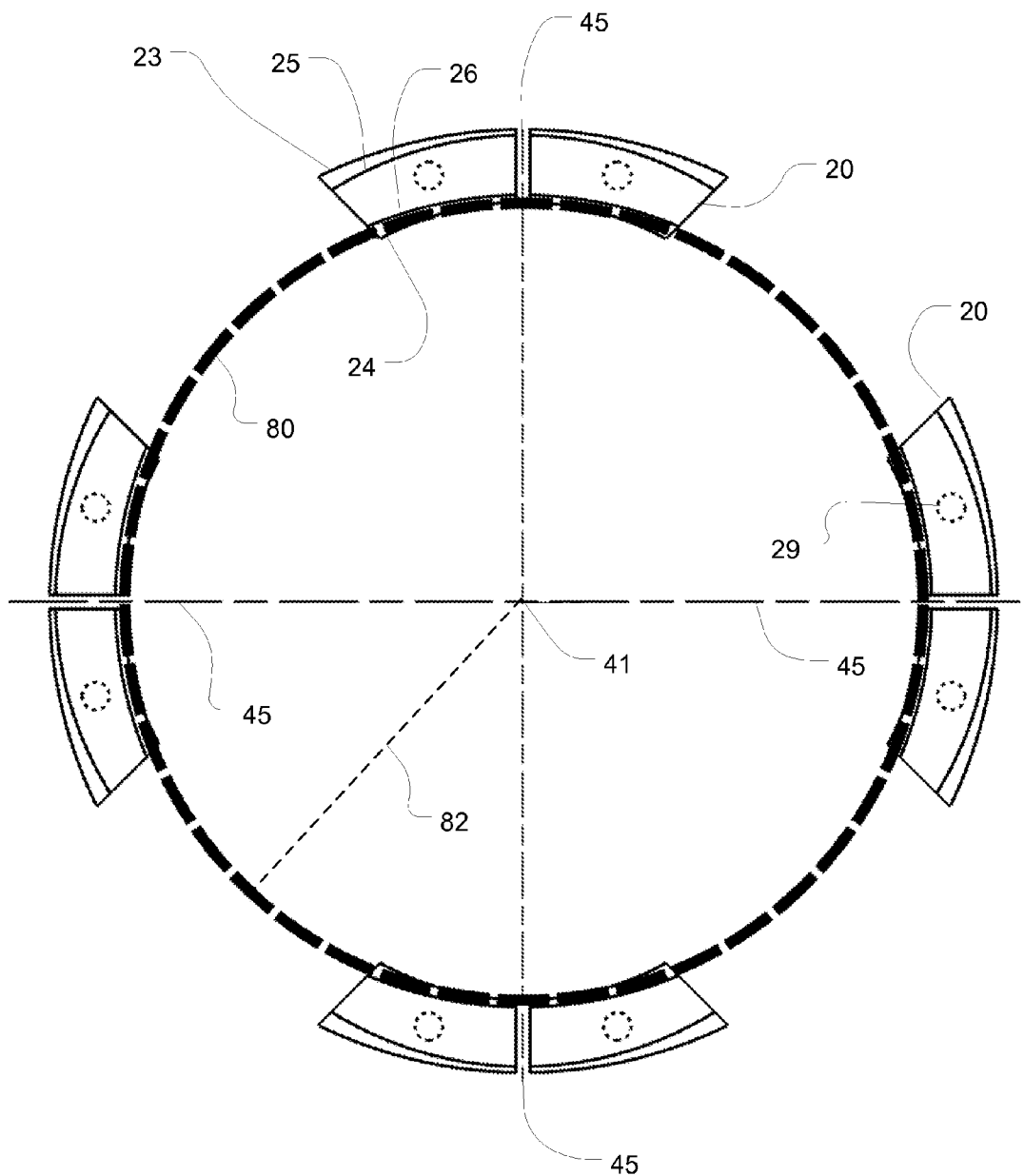
FIG. 8C illustrates a top plan view of an exemplary embodiment of a multiple pivoted lathe chuck jaw assembly compressing a maximum diameter workpiece.

FIG. 8C illustrates a top plan view of an exemplary embodiment of a multiple pivoted lathe chuck jaw assembly compressing a maximum diameter workpiece 80. The chuck, movable elements, and baseplates are not shown in FIG. 8C, see FIG. 1. The location of the outer perimeter of the workpiece 80 is shown in broken lines as the workpiece would block the view of the sub-jaws 20 if shown in its entirety. Note that the chuck not shown in the embodiment illustrated in FIG. 8C would have four radially moveable elements, each attaching to one of four baseplates. The four quarter circle delineator lines 45 are all present in FIG. 8C—they delineate the four baseplates, one from another. Note that the baseplates are in their maximum radius configuration in the embodiment shown in FIG. 8C, i.e., the radially movable elements are expanded to their maximum radius outwards from the center axis 41 of the chuck in order for the sub-jaws 20 to engage a workpiece having a maximum radius.

The sub-jaws 20 shown in FIG. 8C include one pair of sub-jaws 20 per baseplate; eight sub-jaws 20 total. Each sub-jaw 20 is shown with a broken line representation of the blind attachment hole 29. Importantly, each sub-jaw 20 is also shown with its four gripping surfaces. Arrayed from inner to outer location, they are: the first tier compression gripping surface 24, the second tier compression gripping surface 26, the second tier expansion gripping surface 25 and the first tier expansion gripping surface 23.

Note the contact area between the outer perimeter of the workpiece 80 and the second tier compression gripping surfaces 26 of the sub-jaws 20. The entirety of the second tier compression gripping surfaces 26 are in contact with the workpiece 80. This is because the multiple pivoted lathe chuck jaw assembly is optimized to provide maximum contact area between the sub-jaws and the workpiece (and thus, maximum gripping force on the workpiece) at the mid-point and maximum locations of the radially movable elements 92 of the chuck (i.e., with workpieces that have either a mid-point perimeter radius or a maximum perimeter radius). As the workpiece in FIG. 8C has a maximum perimeter radius, the second tier compression gripping surfaces 26, which also have a maximum perimeter radius, exactly match the curve of the workpiece and the contact area is maximized. Critically, the fact that the sub-jaws 20 are each pivotably attached to the baseplate allows the sub-jaws 20 to automatically pivot as necessary so that the full gripping surface can contact the workpiece 80 as the chuck is tightened.

The broken line representing the workpiece 80 in FIG. 8C also defines the location of a second tier compression gripping surface arc which is fixed by the length of the second inner radius 82 which is measured from the central axis to the second tier compression gripping surfaces 26 on the sub-jaws 20 when the radially movable elements are positioned at the maximum expansion point, as they are in FIG. 8C.

Figure 8D:
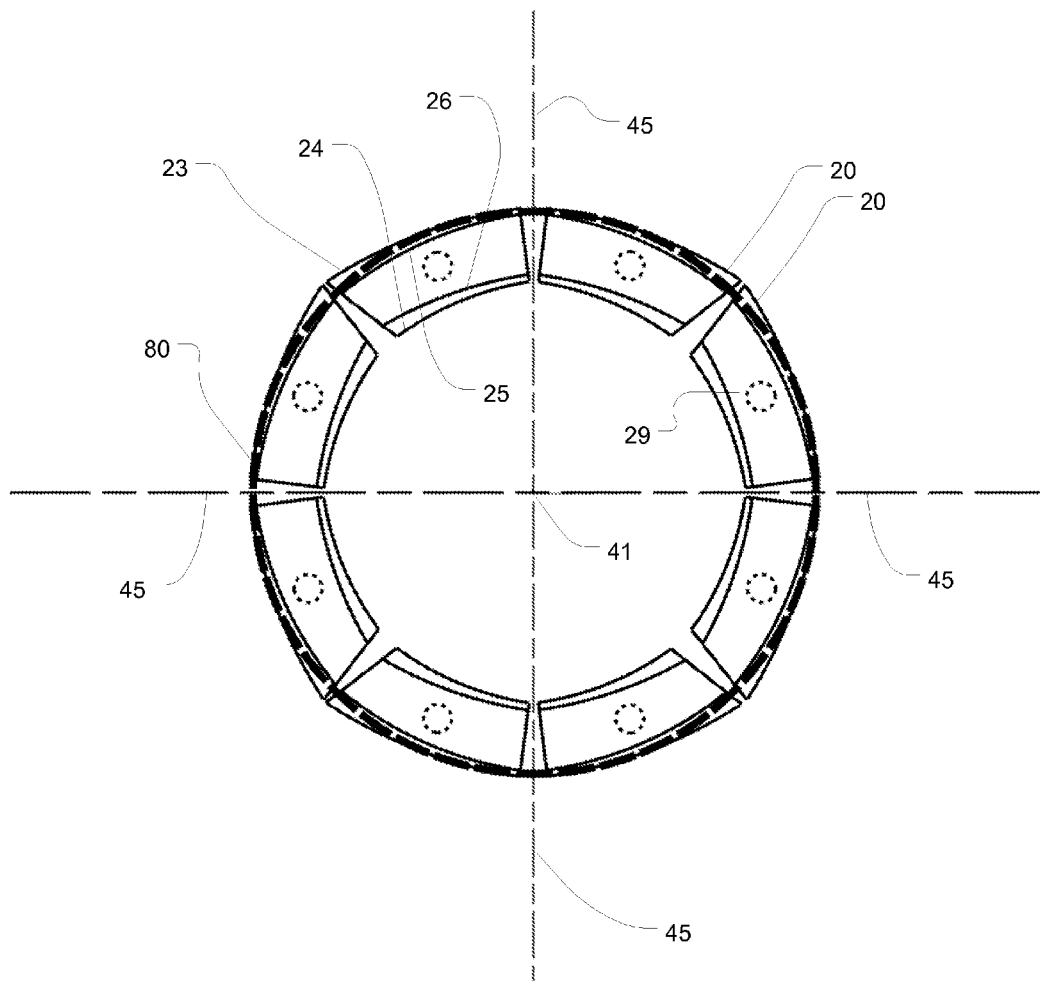
FIG. 8D illustrates a top plan view of an exemplary embodiment of a multiple pivoted lathe chuck jaw assembly expanding into a minimum diameter workpiece.

FIG. 8D illustrates a top plan view of an exemplary embodiment of a multiple pivoted lathe chuck jaw assembly expanding into a minimum diameter workpiece 80. The chuck, movable elements, and baseplates are not shown in FIG. 8D, see FIG. 1. The location of the inner perimeter of the workpiece 80 is shown in broken lines as the workpiece would block the view of the sub-jaws 20 if shown in its entirety. Note that the chuck not shown in the embodiment illustrated in FIG. 8D would have four radially moveable elements, each attaching to one of four baseplates. The four quarter circle delineator lines 45 are all present in FIG. 8D—they delineate the four baseplates, one from another. Note that the baseplates are in their minimum radius configuration in the embodiment shown in FIG. 8D, i.e., the radially movable elements are retracted as far towards the center axis 41 of the chuck as possible in order for the sub-jaws 20 to engage a workpiece having a minimum radius.

The sub-jaws 20 shown in FIG. 8D include one pair of sub-jaws 20 per baseplate; eight sub-jaws 20 total. Each sub-jaw 20 is shown with a broken line representation of the blind attachment hole 29. Importantly, each sub-jaw 20 is also shown with its four gripping surfaces. Arrayed from inner to outer location, they are: the first tier compression gripping surface 24, the second tier compression gripping surface 26, the second tier expansion gripping surface 25 and the first tier expansion gripping surface 23.

Note the contact area between the inner perimeter of the workpiece 80 and second tier expansion gripping surfaces 25 of the sub-jaws 20. A portion of the second tier expansion gripping surfaces 25 are not in contact with the workpiece 80. This is because the multiple pivoted lathe chuck jaw assembly is optimized to provide maximum contact area between the sub-jaws and the workpiece (and thus, maximum gripping force on the workpiece) at the mid-point and maximum locations of the radially moveable elements 92 of the chuck (i.e., with workpieces that have either a mid-point perimeter radius or a maximum perimeter radius, not a minimum perimeter radius, as the workpiece 80 in FIG. 8D has). Critically, the fact that the sub-jaws 20 are each pivotably attached to the baseplate allows the sub-jaws 20 to automatically pivot as necessary so that the optimal gripping locations can contact the workpiece 80 as the chuck is expanded to fully engage the workpiece.

Figure 8E:
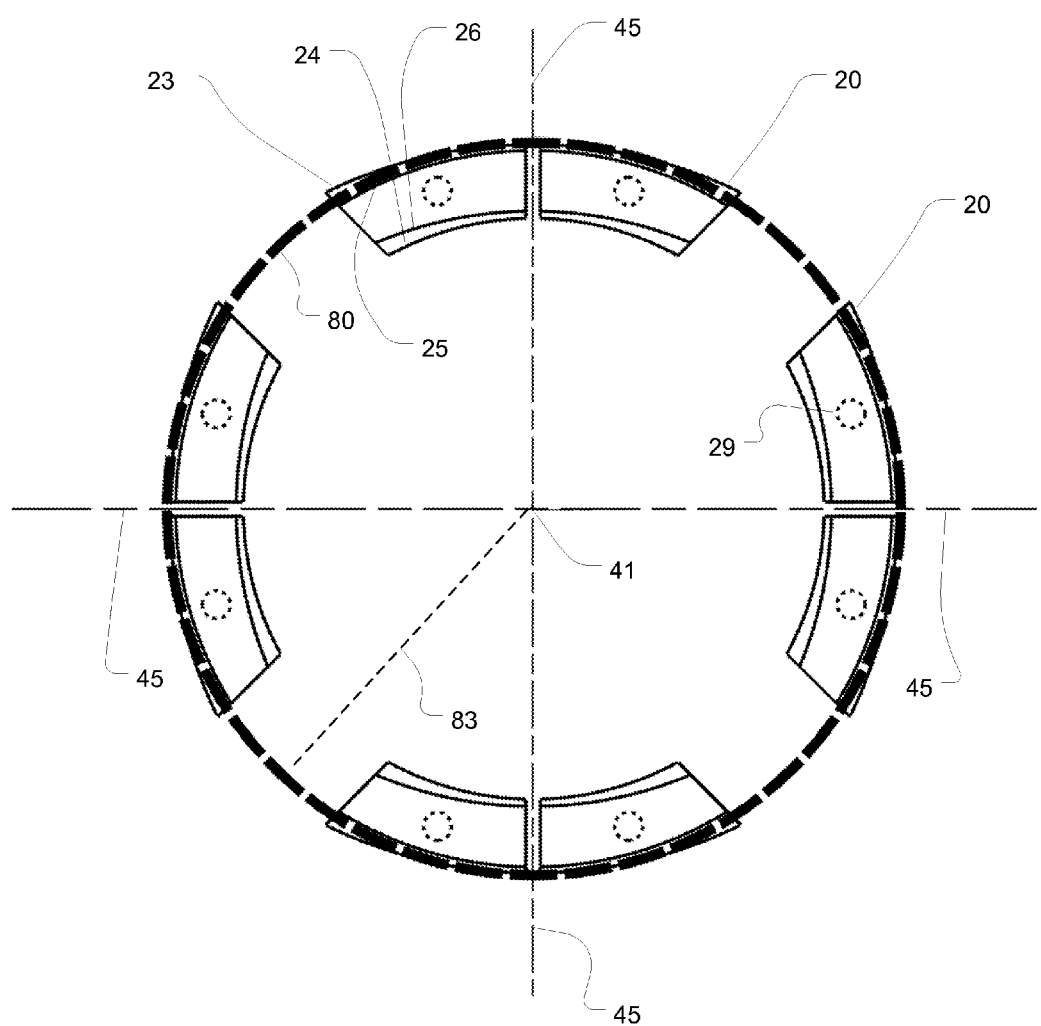
FIG. 8E illustrates a top plan view of an exemplary embodiment of a multiple pivoted lathe chuck jaw assembly expanding into a midpoint diameter workpiece.

FIG. 8E illustrates a top plan view of an exemplary embodiment of a multiple pivoted lathe chuck jaw assembly expanding into a midpoint diameter workpiece 80. The chuck, movable elements, and baseplates are not shown in FIG. 8E, see FIG. 1. The location of the inner perimeter of the workpiece 80 is shown in broken lines as the workpiece would block the view of the sub-jaws 20 if shown in its entirety. Note that the chuck not shown in the embodiment illustrated in FIG. 8E would have four radially moveable elements, each attaching to one of four baseplates. The four quarter circle delineator lines 45 are all present in FIG. 8E—they delineate the four baseplates, one from another. Note that the baseplates are in their mid-point radius configuration in the embodiment shown in FIG. 8E, i.e., the radially movable elements are expanded halfway outwards from the center axis 41 of the chuck in order for the sub-jaws 20 to engage a workpiece having a mid-point radius.

The sub-jaws 20 shown in FIG. 8E include one pair of sub-jaws 20 per baseplate; eight sub-jaws 20 total. Each sub-jaw 20 is shown with a broken line representation of the blind attachment hole 29. Importantly, each sub-jaw 20 is also shown with its four gripping surfaces. Arrayed from inner to outer location, they are: the first tier compression gripping surface 24, the second tier compression gripping surface 26, the second tier expansion gripping surface 25 and the first tier expansion gripping surface 23.

Note the contact area between the inner perimeter of the workpiece 80 and the second tier expansion gripping surfaces 25 of the sub-jaws 20. The entirety of the second tier expansion gripping surfaces 25 are in contact with the workpiece 80. This is because the multiple pivoted lathe chuck jaw assembly is optimized to provide maximum contact area between the sub-jaws and the workpiece (and thus, maximum gripping force on the workpiece) at the mid-point and maximum locations of the radially moveable elements 92 of the chuck (i.e., with workpieces that have either a mid-point perimeter radius or a maximum perimeter radius). As the workpiece in FIG. 8E has a mid-point perimeter radius, the second tier expansion gripping surfaces 25, which also have a mid-point perimeter radius, exactly match the curve of the workpiece and the contact area is maximized. Critically, the fact that the sub-jaws 20 are each pivotably attached to the baseplate allows the sub-jaws 20 to automatically pivot as necessary so that the full gripping surface can contact the workpiece 80 as the chuck is expanded to fully engage the workpiece.

The broken line representing the workpiece 80 in FIG. 8E also defines the location of a second tier expansion gripping surface arc which is fixed by the length of the second outer radius 83 which is measured from the central axis to the second tier expansion gripping surfaces 25 on the sub-jaws 20 when the radially movable elements are positioned at the midway expansion point, as they are in FIG. 8E.

Figure 8F:
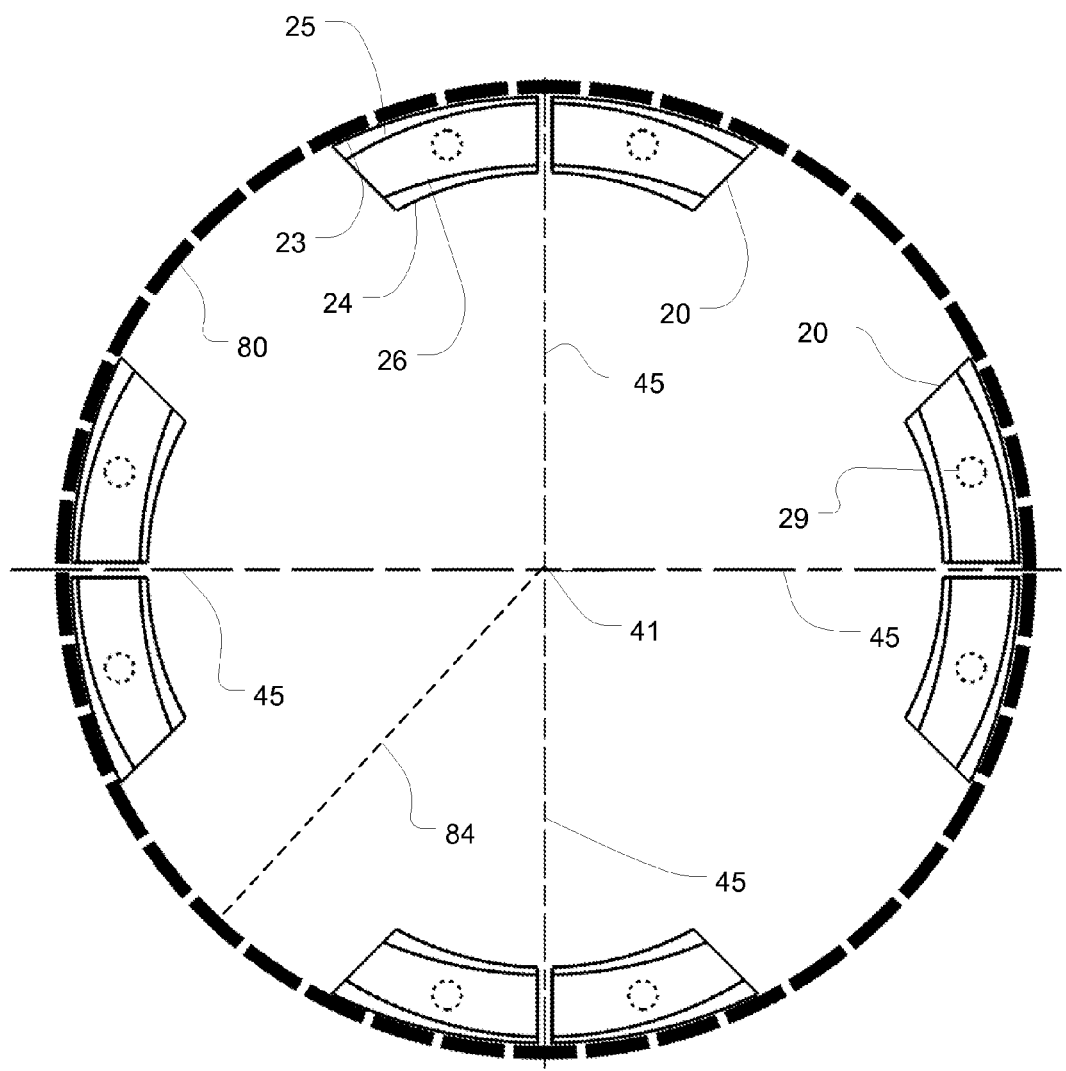
FIG. 8F illustrates a top plan view of an exemplary embodiment of a multiple pivoted lathe chuck jaw assembly expanding into a maximum diameter workpiece.

FIG. 8F illustrates a top plan view of an exemplary embodiment of a multiple pivoted lathe chuck jaw assembly expanding into a maximum diameter workpiece 80. The chuck, movable elements, and baseplates are not shown in FIG. 8F, see FIG. 1. The location of the inner perimeter of the workpiece 80 is shown in broken lines as the workpiece would block the view of the sub-jaws 20 if shown in its entirety. Note that the chuck not shown in the embodiment illustrated in FIG. 8F would have four radially moveable elements, each attaching to one of four baseplates. The four quarter circle delineator lines 45 are all present in FIG. 8F—they delineate the four baseplates, one from another. Note that the baseplates are in their maximum radius configuration in the embodiment shown in FIG. 8F, i.e., the radially movable elements are expanded to their maximum radius outwards from the center axis 41 of the chuck in order for the sub-jaws 20 to engage a workpiece having a maximum radius.

The sub-jaws 20 shown in FIG. 8F include one pair of sub-jaws 20 per baseplate; eight sub-jaws 20 total. Each sub-jaw 20 is shown with a broken line representation of the blind attachment hole 29. Importantly, each sub-jaw 20 is also shown with its four gripping surfaces. Arrayed from inner to outer location, they are: the first tier compression gripping surface 24, the second tier compression gripping surface 26, the second tier expansion gripping surface 25 and the first tier expansion gripping surface 23.

Note the contact area between the inner perimeter of the workpiece 80 and the first tier expansion gripping surfaces 23 of the sub-jaws 20. The entirety of the first tier expansion gripping surfaces 23 are in contact with the workpiece 80. This is because the multiple pivoted lathe chuck jaw assembly is optimized to provide maximum contact area between the sub-jaws and the workpiece (and thus, maximum gripping force on the workpiece) at the mid-point and maximum locations of the radially moveable elements 92 of the chuck (i.e., with workpieces that have either a mid-point perimeter radius or a maximum perimeter radius). As the workpiece in FIG. 8F has a maximum perimeter radius, the first tier expansion gripping surfaces 23, which also have a maximum perimeter radius, exactly match the curve of the workpiece and the contact area is maximized. Critically, the fact that the sub-jaws 20 are each pivotably attached to the baseplate allows the sub-jaws 20 to automatically pivot as necessary so that the full gripping surface can contact the workpiece 80 as the chuck is expanded to fully engage the workpiece.

The broken line representing the workpiece 80 in FIG. 8F also defines the location of a first tier expansion gripping surface arc which is fixed by the length of the first outer radius 84 which is measured from the central axis to the first tier expansion gripping surfaces 23 on the sub-jaws 20 when the radially movable elements are positioned at the maximum expansion point, as they are in FIG. 8F.

Figure 9A:
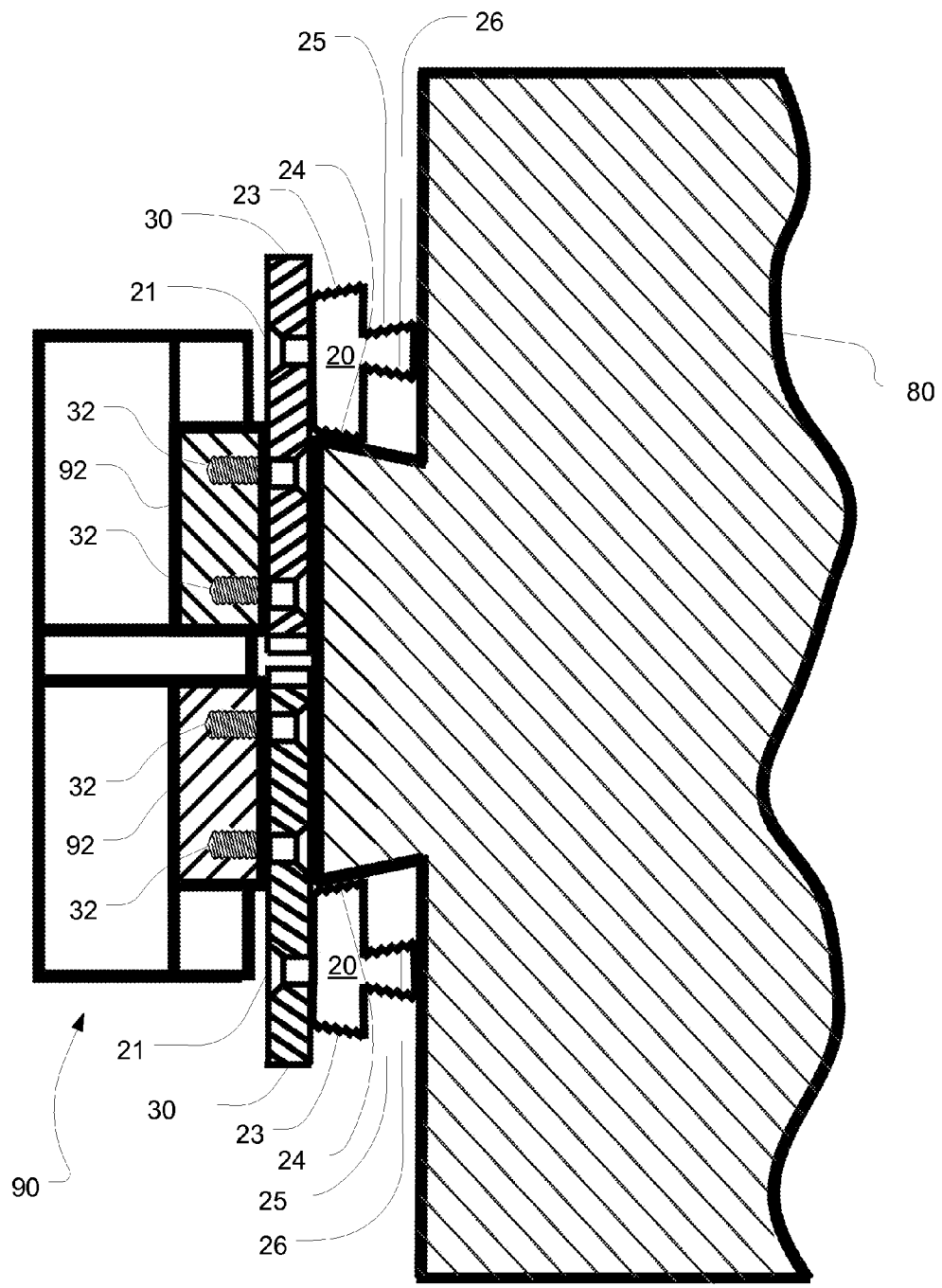
FIG. 9A illustrates a side cross-section view of an exemplary embodiment of a multiple pivoted lathe chuck jaw assembly compressing a minimum diameter workpiece.

FIG. 9A illustrates a side cross-section view of an exemplary embodiment of a multiple pivoted lathe chuck jaw assembly compressing a minimum diameter workpiece 80. FIG. 9A corresponds to the illustration in FIG. 8A. In both, the workpiece 80 is a minimum diameter workpiece being compressed by the sub-jaws 20 using the first tier compression gripping surfaces 24. The baseplates 30 are shown in FIG. 9A attached to the radially movable elements 92 of the chuck 90 by the baseplate attachment screws 32. Also shown are the pivot screws 21 which pivotably attach the sub-jaws 20 to the baseplates 30.

Figure 9B:
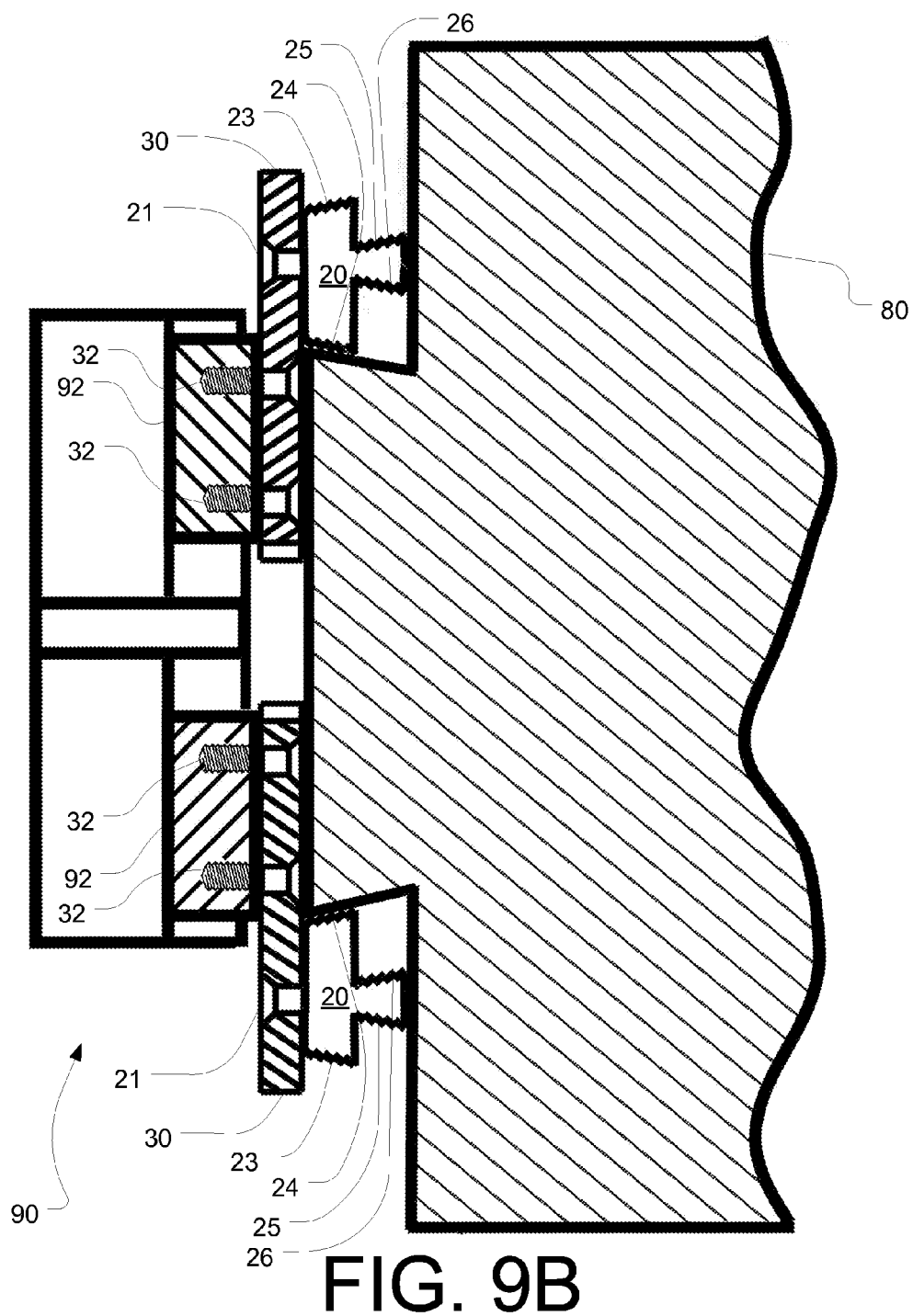
FIG. 9B illustrates a side cross-section view of an exemplary embodiment of a multiple pivoted lathe chuck jaw assembly compressing a midpoint diameter workpiece.

FIG. 9B illustrates a side cross-section view of an exemplary embodiment of a multiple pivoted lathe chuck jaw assembly compressing a midpoint diameter workpiece 80. FIG. 9B corresponds to the illustration in FIG. 8B. In both, the workpiece 80 is a mid-point diameter workpiece being compressed by the sub-jaws 20 using the first tier compression gripping surfaces 24. The baseplates 30 are shown in FIG. 9B attached to the radially movable elements 92 of the chuck 90 by the baseplate attachment screws 32. Also shown are the pivot screws 21 which pivotably attach the sub-jaws 20 to the baseplates 30.

Figure 9C:
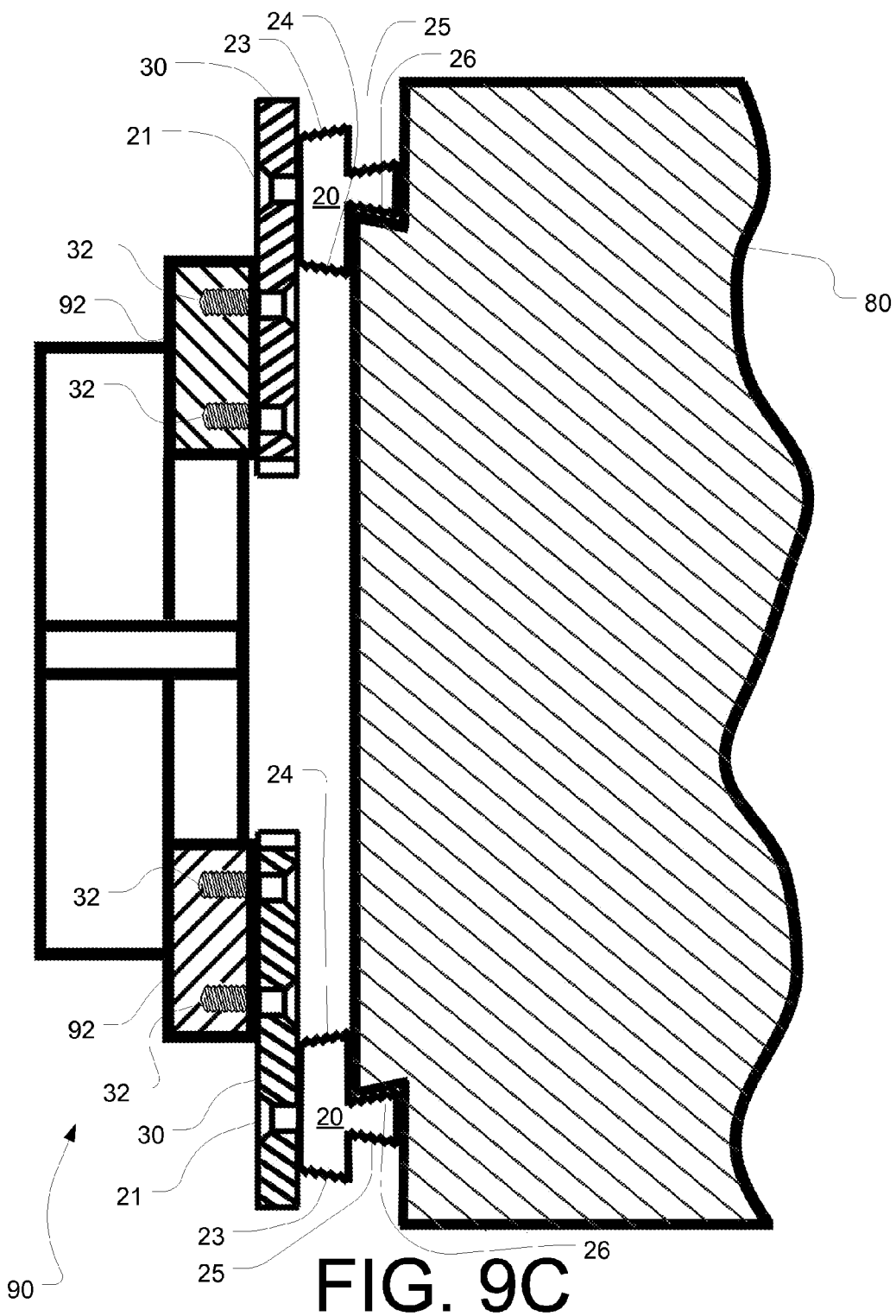
FIG. 9C illustrates a side cross-section view of an exemplary embodiment of a multiple pivoted lathe chuck jaw assembly compressing a maximum diameter workpiece.

FIG. 9C illustrates a side cross-section view of an exemplary embodiment of a multiple pivoted lathe chuck jaw assembly compressing a maximum diameter workpiece 80. FIG. 9C corresponds to the illustration in FIG. 8C. In both, the workpiece 80 is a maximum diameter workpiece being compressed by the sub-jaws 20 using the second tier compression gripping surfaces 26. The baseplates 30 are shown in FIG. 9C attached to the radially movable elements 92 of the chuck 90 by the baseplate attachment screws 32. Also shown are the pivot screws 21 which pivotably attach the sub-jaws 20 to the baseplates 30.

Figure 9D:
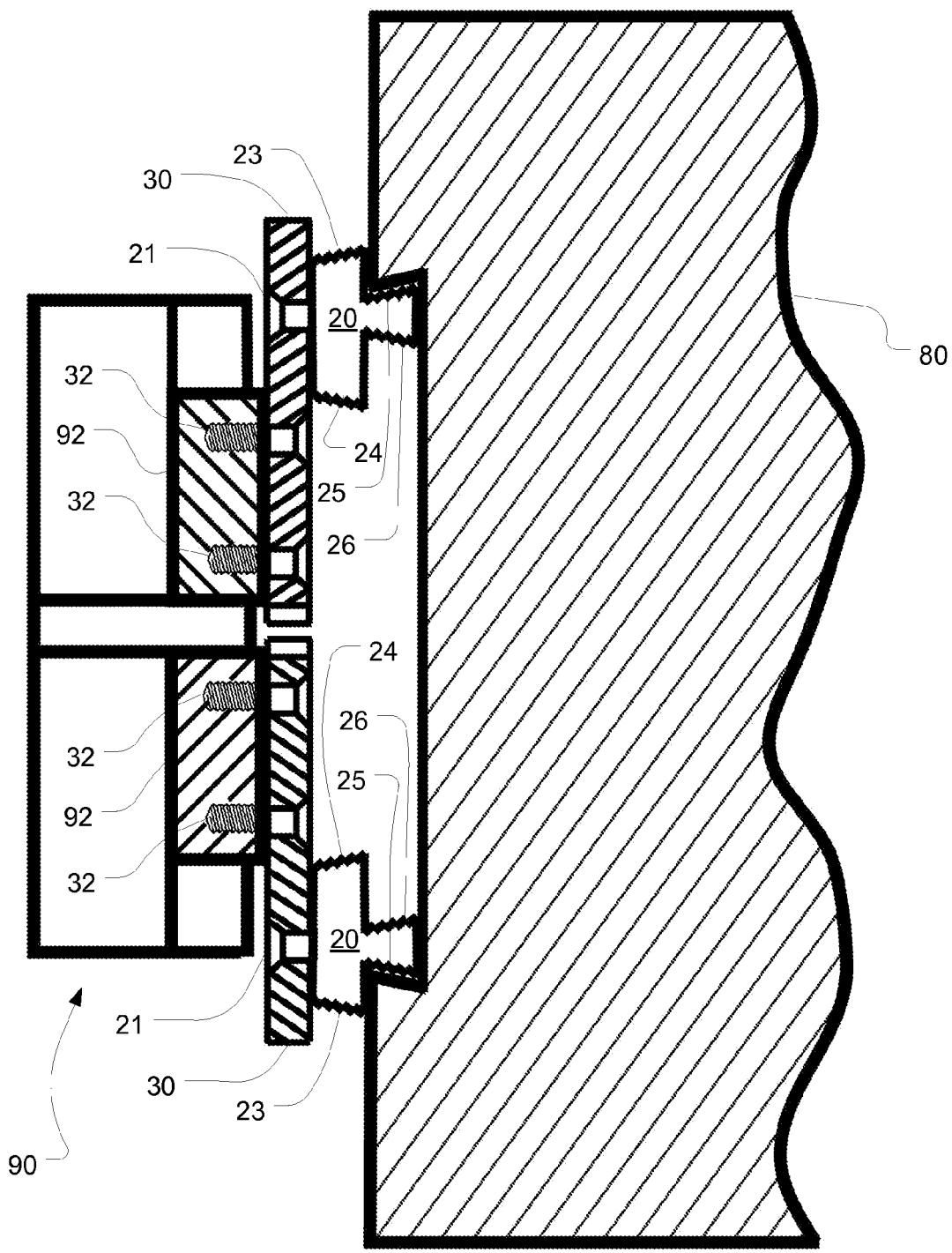
FIG. 9D illustrates a side cross-section view of an exemplary embodiment of a multiple pivoted lathe chuck jaw assembly expanding into a minimum diameter workpiece.

FIG. 9D illustrates a side cross-section view of an exemplary embodiment of a multiple pivoted lathe chuck jaw assembly expanding into a minimum diameter workpiece 80. FIG. 9D corresponds to the illustration in FIG. 8D. In both, the workpiece 80 is a minimum diameter workpiece being expanded into by the sub-jaws 20 using the second tier expansion gripping surfaces 25. The baseplates 30 are shown in FIG. 9D attached to the radially movable elements 92 of the chuck 90 by the baseplate attachment screws 32. Also shown are the pivot screws 21 which pivotably attach the sub-jaws 20 to the baseplates 30.

Figure 9E:
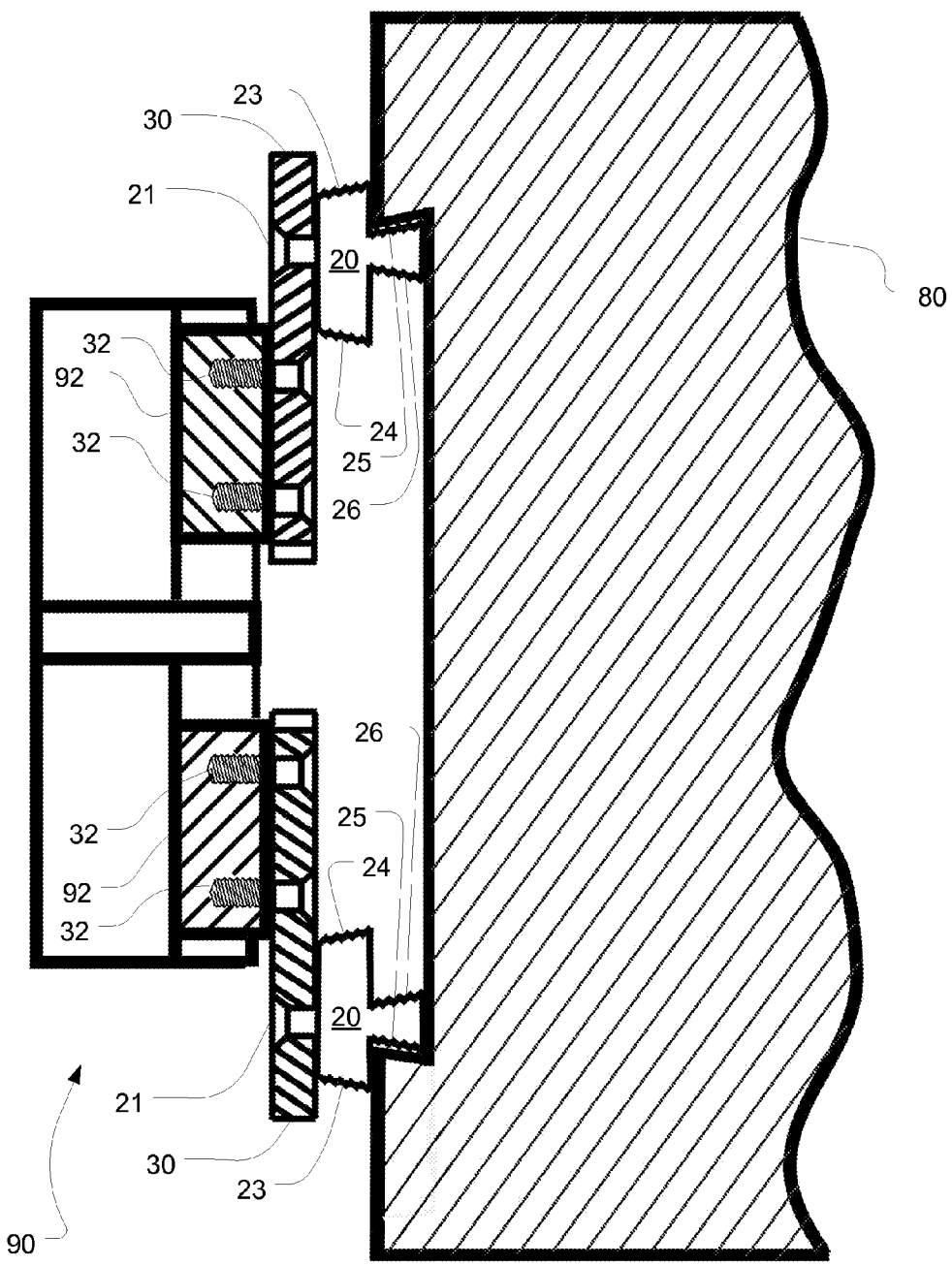
FIG. 9E illustrates a side cross-section view of an exemplary embodiment of a multiple pivoted lathe chuck jaw assembly expanding into a midpoint diameter workpiece.

FIG. 9E illustrates a side cross-section view of an exemplary embodiment of a multiple pivoted lathe chuck jaw assembly expanding into a midpoint diameter workpiece 80. FIG. 9E corresponds to the illustration in FIG. 8E. In both, the workpiece 80 is a mid-point diameter workpiece being expanded into by the sub-jaws 20 using the second tier expansion gripping surfaces 25. The baseplates 30 are shown in FIG. 9E attached to the radially movable elements 92 of the chuck 90 by the baseplate attachment screws 32. Also shown are the pivot screws 21 which pivotably attach the sub-jaws 20 to the baseplates 30.

Figure 9F:
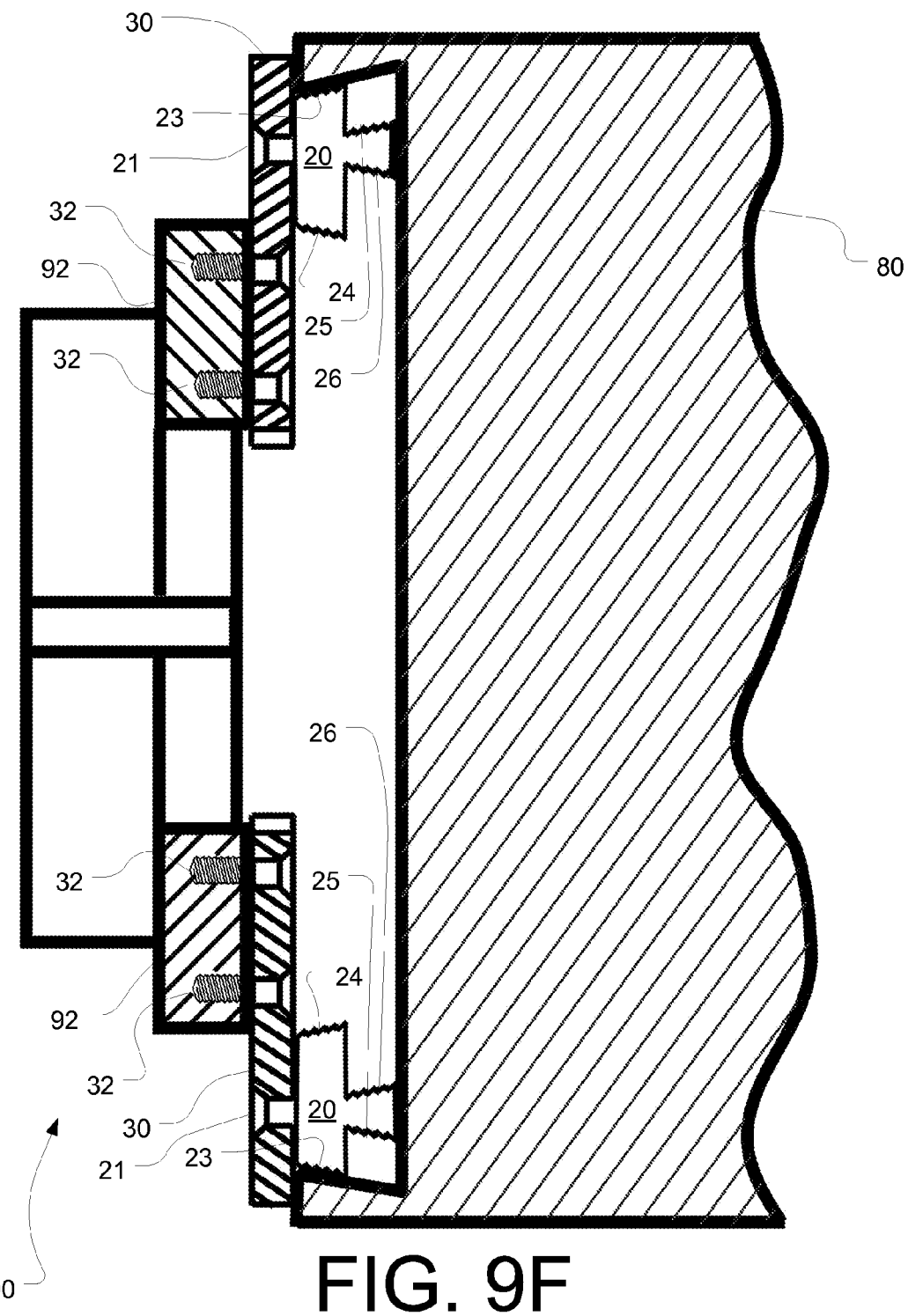
FIG. 9F illustrates a side cross-section view of an exemplary embodiment of a multiple pivoted lathe chuck jaw assembly expanding into a maximum diameter workpiece.

FIG. 9F illustrates a side cross-section view of an exemplary embodiment of a multiple pivoted lathe chuck jaw assembly expanding into a maximum diameter workpiece 80. FIG. 9F corresponds to the illustration in FIG. 8F. In both, the workpiece 80 is a maximum diameter workpiece being expanded into by the sub-jaws 20 using the first tier expansion gripping surfaces 23. The baseplates 30 are shown in FIG. 9F attached to the radially movable elements 92 of the chuck 90 by the baseplate attachment screws 32. Also shown are the pivot screws 21 which pivotably attach the sub-jaws 20 to the baseplates 30.

Figure 10A:
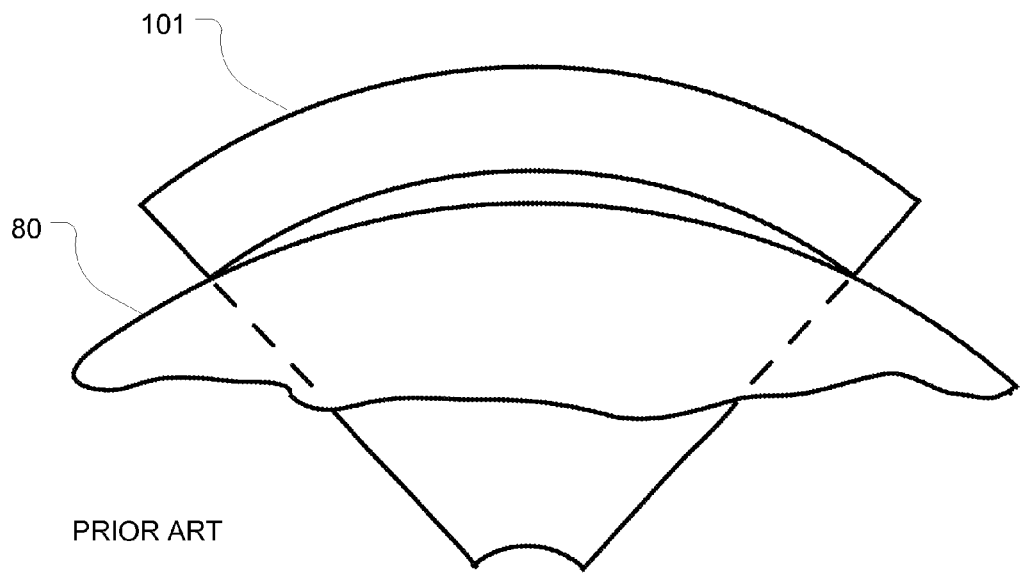
FIG. 10A illustrates a top plan view of an exemplary embodiment of a prior art lathe chuck jaw assembly compressing a workpiece with a diameter halfway between midpoint and maximum.

FIG. 10A illustrates a top plan view of an exemplary embodiment of a prior art lathe chuck jaw compressing a workpiece 80 with a diameter halfway between midpoint and maximum. Note the contact area between the outer perimeter of the workpiece 80 and the prior art compression gripping surface. A center portion of the jaw is not in contact with the workpiece 80 while the two side edges of the jaw are. A significant gap exists between the workpiece and the center of the jaw without surface gripping.

Figure 10B:
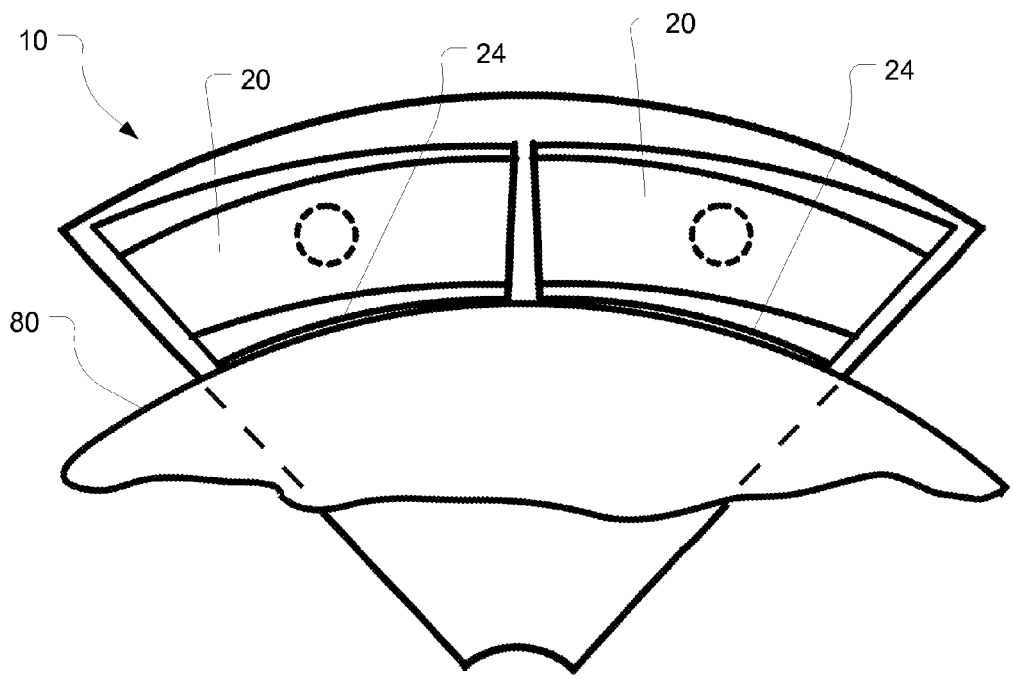
FIG. 10B illustrates a top plan view of an exemplary embodiment of a multiple pivoted lathe chuck jaw assembly compressing a workpiece with a diameter halfway between midpoint and maximum.

FIG. 10B illustrates a top plan view of an exemplary embodiment of a multiple pivoted lathe chuck jaw assembly having lathe chuck jaw assembly 10 compressing a workpiece 80 with a diameter halfway between midpoint and maximum. Note the contact area between the outer perimeter of the workpiece 80 and the first tier compression gripping surfaces 24 of the sub-jaws 20. A center portion of the two first tier compression gripping surfaces 24 of both mirrored sub-jaws 20 are not in contact with the workpiece 80 while the two side edges of both sub-jaws 20 are. Critically, the fact that the sub-jaws 20 are each pivotably attached to the baseplate allows the sub-jaws 20 to automatically pivot as necessary so that the optimal gripping locations can contact the workpiece 80 as the chuck is tightened. By comparing the gap and angle of incidence between the jaw surface and workpiece between FIG. 10B and that shown in FIG. 10A it is observed that this invention's gripping surface is greater than that of the prior art jaw design. A similar condition exists for any workpiece with a diameter halfway between a midpoint and minimum diameter.

Figure 11:
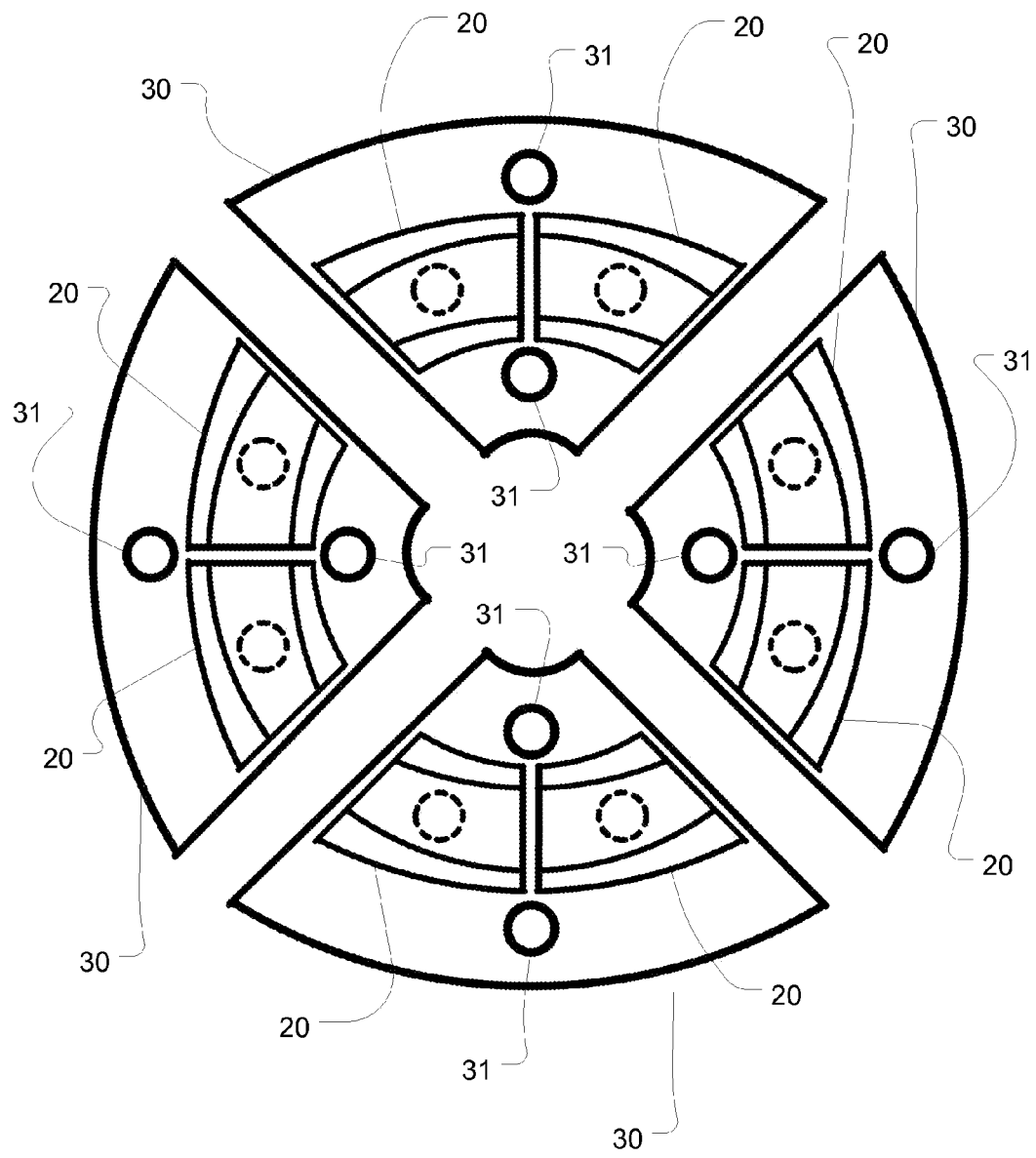
FIG. 11 illustrates a top, plan view of another exemplary embodiment of a multiple pivoted lathe chuck jaw assembly having two sub-jaws located between the screws attaching each baseplate to a chuck's radially movable elements on a four-section chuck.

FIG. 11 illustrates a top, plan view of another exemplary embodiment of a multiple pivoted lathe chuck jaw assembly having two sub-jaws located between the screws attaching each baseplate to a chuck's radially movable elements on a four-section chuck. In the embodiment shown in FIG. 11, there are four baseplates 30 shown, each having a pair of sub-jaws 20. The sub-jaws 20 are mounted to the baseplates 30 between the baseplate attachment holes 31.

Figure 12:
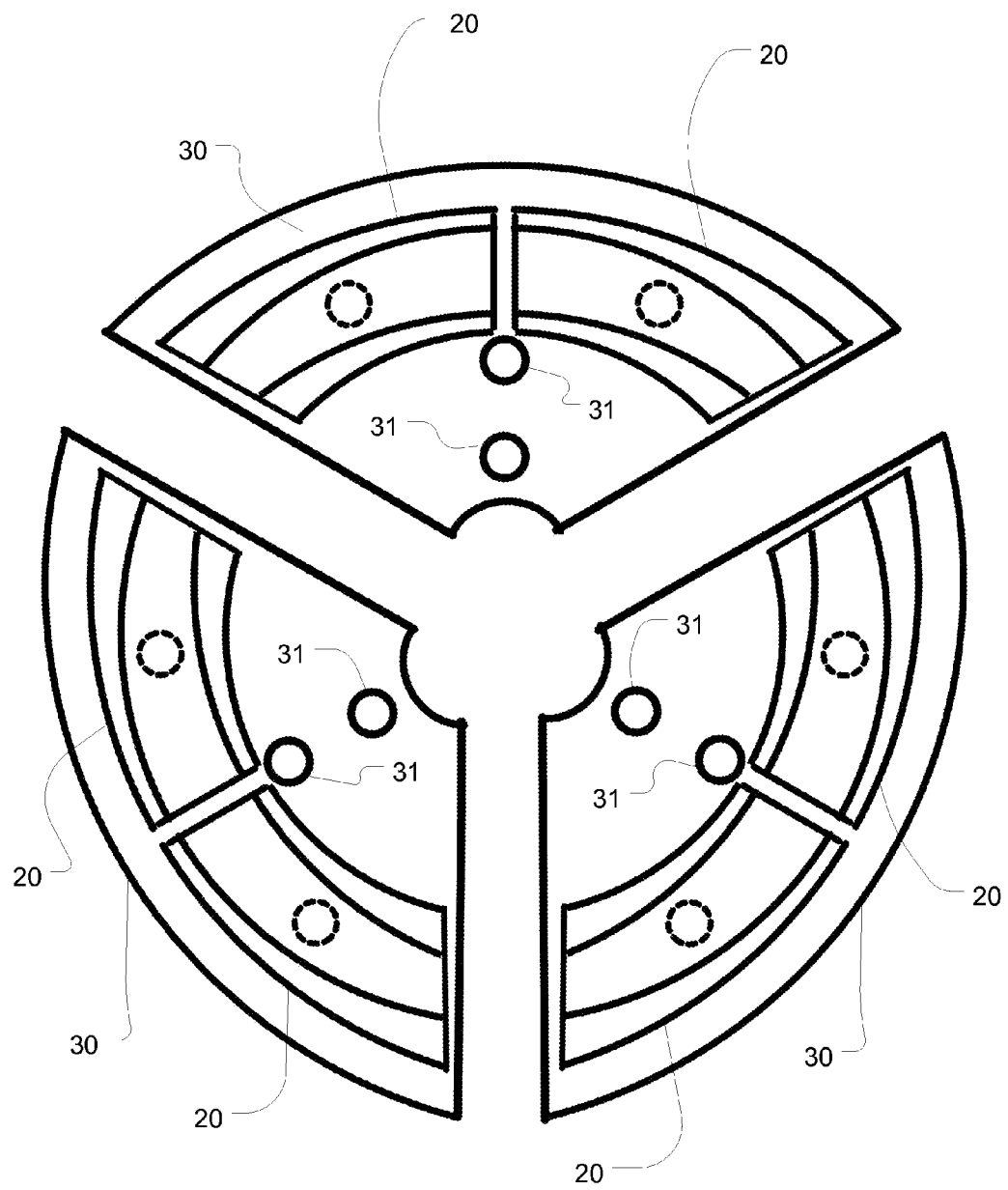
FIG. 12 illustrates a top, plan view of yet another exemplary embodiment of a multiple pivoted lathe chuck jaw assembly having two sub-jaws located outwards from the screws attaching each baseplate to a chuck's radially movable elements on a three-section chuck.

FIG. 12 illustrates a top, plan view of yet another exemplary embodiment of a multiple pivoted lathe chuck jaw assembly having two sub-jaws located outwards from the screws attaching each baseplate to a chuck's radially movable elements on a three-section chuck. In the embodiment shown in FIG. 12, there are three baseplates 30 shown, each having a pair of sub-jaws 20. The sub-jaws 20 are mounted to the baseplates 30 radially outwards from the baseplate attachment holes 31.

While particular embodiments of the invention have been described and disclosed in the present application, it should be understood that any number of permutations, modifications, or embodiments may be made without departing from the spirit and scope of this invention. Accordingly, it is not the intention of this application to limit this invention in any way except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above "Detailed Description" section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise embodiment or form disclosed herein or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

In light of the above "Detailed Description," the Inventor may make changes to the invention. While the detailed description outlines possible embodiments of the invention and discloses the best mode contemplated, no matter how detailed the above appears in text, the invention may be practiced in a myriad of ways. Thus, implementation details may vary considerably while still being encompassed by the spirit of the invention as disclosed by the inventor. As discussed herein, specific terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

The above specification, examples and data provide a description of the structure and use of exemplary implementations of the described articles of manufacture and methods. It is important to note that many implementations can be made without departing from the spirit and scope of the invention.

What is claimed is:

1. A multiple pivoted lathe chuck jaw assembly configured to be mounted on a lathe chuck, the lathe chuck having a central axis and a radially movable element that can be adjusted inwards and outwards from the central axis, the multiple pivoted lathe chuck jaw assembly comprising:

a baseplate having a front face, a rear face, a left edge, and a right edge;

a jaw assembly attachment on the rear face of the baseplate that attaches the baseplate to one of the radially moveable elements on the lathe chuck such that the baseplate is positioned perpendicular to the central axis of the lathe chuck and is radially movable inwards and outwards from the central axis in response to adjustment of the radially movable element;

wherein, when the radially movable element is adjusted maximally inwards, the baseplate is at a minimum expansion point, when the radially movable element is adjusted maximally outwards, the baseplate is at a maximum expansion point, and when the radially movable element is adjusted midway between maximally inwards and maximally outwards, the baseplate is at a midway expansion point;

a first pivoting attachment point on the front face and a second pivoting attachment point on the front face, the first and second pivoting attachment points are located along a pivoting attachment point arc defined by a pivoting attachment point radius measured from the central axis and extending from the left edge to the right edge;

a first sub-jaw pivotably attached to the front face of the baseplate at the first pivoting attachment point and a second sub-jaw pivotably attached to the front face of the baseplate at the second pivoting attachment point;

the first sub-jaw having a first tier and a second tier wherein the first tier is positioned above the front face of the baseplate and the second tier is positioned above the first tier;

the first tier having a first tier compression gripping surface located along a first tier compression gripping surface arc defined by a first inner radius measured from the central axis, and a first tier expansion gripping surface located along a first tier expansion gripping surface arc defined by a first outer radius measured from the central axis;

the second tier having a second tier compression gripping surface located along a second tier compression gripping surface arc defined by a second inner radius measured from the central axis, and a second tier expansion gripping surface located along a second tier expansion gripping surface arc defined by a second outer radius measured from the central axis;

wherein, when the baseplate is at the midway expansion point, the first inner radius matches a radius from the first tier compression gripping surface arc to the central axis such that a first workpiece being compressed by the first sub-jaw would have a workpiece radius that corresponds to the radius from the first tier compression gripping surface arc to the central axis, causing the first tier compression gripping surface to have maximum surface area contact with the first workpiece;

wherein, when the baseplate is at the midway expansion point, the second outer radius matches a radius from the second tier expansion gripping surface arc to the central axis such that a second workpiece being expanded by the first sub-jaw would have a workpiece inner radius that corresponds to the radius from the second tier expansion gripping surface arc to the central axis, causing the second tier expansion gripping surface to have maximum surface area contact with the second workpiece;

wherein, when the baseplate is at the maximum expansion point, the second inner radius matches a radius from the second tier compression gripping surface arc to the central axis such that a third workpiece being compressed by the first sub-jaw would have a workpiece radius that corresponds to the radius from the second tier compression gripping surface arc to the central axis, causing the second tier compression gripping surface to have maximum surface area contact with the third workpiece; and wherein, when the baseplate is at the maximum expansion point, the first outer radius matches a radius from the first tier expansion gripping surface arc to the central axis such that a fourth workpiece being expanded by the first sub-jaw would have a workpiece inner radius that corresponds to the radius from the first tier expansion gripping surface arc to the central axis, causing the first tier expansion gripping surface to have maximum surface area contact with the fourth workpiece.

2. The multiple pivoted lathe chuck jaw assembly of claim 1, wherein the first pivoting attachment point is located along a pivoting attachment point arc one quarter of a length of the arc from the left edge, and the second pivoting attachment point is located along the pivoting attachment point arc one quarter of the length of the arc from the right edge.

3. The multiple pivoted lathe chuck jaw assembly of claim 2, further comprising:
the first sub-jaw having a sub-jaw bottom surface located between the first tier compression gripping surface and the first tier expansion gripping surface and resting upon the front face of the baseplate; and
wherein the sub-jaw bottom surface having a blind attachment hole located in the center of the sub-jaw bottom surface that aligns with the first pivoting attachment point on the baseplate and assists in pivotably attaching the first sub-jaw to the baseplate.

4. The multiple pivoted lathe chuck jaw assembly of claim 3, further comprising:
a pivot screw extending from the front face of the baseplate and into the blind attachment hole in the first sub-jaw, thereby pivotably attaching the first sub-jaw to the baseplate.

5. The multiple pivoted lathe chuck jaw assembly of claim 4, further comprising:
the first tier of the first sub-jaw having a first tier top surface located between the first tier compression gripping surface and the first tier expansion gripping surface and extending parallel with the first sub-jaw bottom surface; and
wherein the second tier compression gripping surface and the second tier expansion gripping surface each are positioned at a dovetail taper to the first tier top surface such that a third angle measured between the first tier top surface and the second tier compression gripping surface is less than ninety degrees and a fourth angle measured between the first tier top surface and the second tier expansion gripping surface is less than ninety degrees.

6. The multiple pivoted lathe chuck jaw assembly of claim 1, further comprising:
the first sub-jaw having a sub-jaw bottom surface located between the first tier compression gripping surface and the first tier expansion gripping surface and resting upon the front face of the baseplate; and
wherein the sub-jaw bottom surface having a blind attachment hole located in the center of the sub-jaw bottom surface that aligns with the first pivoting attachment point on the baseplate and assists in pivotably attaching the first sub-jaw to the baseplate.

7. The multiple pivoted lathe chuck jaw assembly of claim 6, further comprising:
a pivot screw extending from the front face of the baseplate and into the blind attachment hole in the first sub-jaw, thereby pivotably attaching the first sub-jaw to the baseplate.

8. The multiple pivoted lathe chuck jaw assembly of claim 7, wherein the first tier compression gripping surface and the first tier expansion gripping surface each are positioned at a dovetail taper to the front face such that a first angle measured between the front face and the first tier compression gripping surface is less than ninety degrees and a second angle measured between the front face and the first tier expansion gripping surface is less than ninety degrees.

9. The multiple pivoted lathe chuck jaw assembly of claim 6, further comprising:
the first tier of the first sub-jaw having a first tier top surface located between the first tier compression gripping surface and the first tier expansion gripping surface and extending parallel with the first sub-jaw bottom surface; and wherein the second tier compression gripping surface and the second tier expansion gripping surface each are positioned at a dovetail taper to the first tier top surface such that a third angle measured between the first tier top surface and the second tier compression gripping surface is less than ninety degrees and a fourth angle measured between the first tier top surface and the second tier expansion gripping surface is less than ninety degrees.

10. The multiple pivoted lathe chuck jaw assembly of claim 1, wherein the first tier compression gripping surface and the first tier expansion gripping surface each are positioned at a dovetail taper to the front face such that a first angle measured between the front face and the first tier compression gripping surface is less than ninety degrees and a second angle measured between the front face and the first tier expansion gripping surface is less than ninety degrees.

11. The multiple pivoted lathe chuck jaw assembly of claim 1, further comprising:
   a plurality of force-directed serrations on at least one of: the first tier compression gripping surface, the first tier expansion gripping surface, the second tier compression gripping surface, and the second tier expansion gripping surface;
   the plurality of force-directed serrations each having a vertical extension tooth wall and an angled tooth wall;
   the vertical extension tooth wall extending outwards from the gripping surface, approximately parallel to the front face, and terminating at a serration point; and
   the angled tooth wall extending outwards from the gripping surface at an angle of less than ninety degrees measured from the front face and also terminating at the serration point.

12. The multiple pivoted lathe chuck jaw assembly of claim 1 wherein the first and second sub-jaws are made from a material selected from the following: metal, ceramic, and nylon.

13. A multiple pivoted lathe chuck jaw assembly configured to be mounted on a lathe chuck, the lathe chuck having a central axis and a radially movable element that can be adjusted inwards and outwards from the central axis, the multiple pivoted lathe chuck jaw assembly comprising:
   a baseplate having a front face, a rear face, a left edge, and a right edge;
   a jaw assembly attachment on the rear face of the baseplate that attaches the baseplate to one of the radially moveable elements on the lathe chuck such that the baseplate is positioned perpendicular to the central axis of the lathe chuck and is radially movable inwards and outwards from the central axis in response to adjustment of the radially movable element;
   wherein, when the radially movable element is adjusted maximally inwards, the baseplate is at a minimum expansion point, when the radially movable element is adjusted maximally outwards, the baseplate is at a maximum expansion point, and when the radially movable element is adjusted midway between maximally inwards and maximally outwards, the baseplate is at a midway expansion point;
   a first pivoting attachment point on the front face and a second pivoting attachment point on the front face, the first and second pivoting attachment points are located along a pivoting attachment point arc defined by a pivoting attachment point radius measured from the central axis and extending from the left edge to the right edge;
   a first sub-jaw pivotably attached to the front face of the baseplate at the first pivoting attachment point and a second sub-jaw pivotably attached to the front face of the baseplate at the second pivoting attachment point;
   the first sub-jaw having a first tier and a second tier wherein the first tier is positioned above the front face of the baseplate and the second tier is positioned above the first tier;
   the first tier having a first tier compression gripping surface located along a first tier compression gripping surface arc defined by a first inner radius measured from the central axis, and a first tier expansion gripping surface located along a first tier expansion gripping surface arc defined by a first outer radius measured from the central axis;
   the second tier having a second tier compression gripping surface located along a second tier compression gripping surface arc defined by a second inner radius measured from the central axis, and a second tier expansion gripping surface located along a second tier expansion gripping surface arc defined by a second outer radius measured from the central axis;
   a plurality of force-directed serrations on at least one of: the first tier compression gripping surface, the first tier expansion gripping surface, the second tier compression gripping surface, and the second tier expansion gripping surface;
   the plurality of force-directed serrations each having a vertical extension tooth wall and an angled tooth wall;
   the vertical extension tooth wall extending outwards from the gripping surface, approximately parallel to the front face, and terminating at a serration point;
   the angled tooth wall extending outwards from the gripping surface at an angle of less than ninety degrees measured from the front face and also terminating at the serration point;
   wherein, when the baseplate is at the midway expansion point, the first inner radius matches a radius from the first tier compression gripping surface arc to the central axis such that a first workpiece being compressed by the first sub-jaw would have a workpiece radius that corresponds to the radius from the first tier compression gripping surface arc to the central axis, causing the first tier compression gripping surface to have maximum surface area contact with the first workpiece;
   wherein, when the baseplate is at the midway expansion point, the second outer radius matches a radius from the second tier expansion gripping surface arc to the central axis such that a second workpiece being expanded by the first sub-jaw would have a workpiece inner radius that corresponds to the radius from the second tier expansion gripping surface arc to the central axis, causing the second tier expansion gripping surface to have maximum surface area contact with the second workpiece;
   wherein, when the baseplate is at the maximum expansion point, the second inner radius matches a radius from the second tier compression gripping surface arc to the central axis such that a third workpiece being compressed by the first sub-jaw would have a workpiece radius that corresponds to the radius from the second tier compression gripping surface arc to the central axis, causing the second tier compression gripping surface to have maximum surface area contact with the third workpiece; and
   wherein, when the baseplate is at the maximum expansion point, the first outer radius matches a radius from the first tier expansion gripping surface arc to the central axis such that a fourth workpiece being expanded by the first sub-jaw would have a workpiece inner radius that corresponds to the radius from the first tier expansion gripping surface arc to the central axis, causing the first tier expansion gripping surface to have maximum surface area contact with the fourth workpiece.

14. The multiple pivoted lathe chuck jaw assembly of claim 13, wherein the first pivoting attachment point is located along the pivoting attachment point arc one quarter of the length of the arc from the left edge, and the second pivoting attachment point is located along the pivoting attachment point arc one quarter of the length of the arc from the right edge.

15. The multiple pivoted lathe chuck jaw assembly of claim 14, further comprising:
   the first sub-jaw having a sub-jaw bottom surface located between the first tier compression gripping surface and the first tier expansion gripping surface and resting upon the front face of the baseplate; and
   wherein the sub-jaw bottom surface having a blind attachment hole located in the center of the sub-jaw bottom surface that aligns with the first pivoting attachment point on the baseplate and assists in pivotably attaching the first sub-jaw to the baseplate.

16. The multiple pivoted lathe chuck jaw assembly of claim 15, further comprising:
   a pivot screw extending from the front face of the baseplate and into the blind attachment hole in the first sub-jaw, thereby pivotably attaching the first sub-jaw to the baseplate.

17. The multiple pivoted lathe chuck jaw assembly of claim 16, further comprising:
   the first tier of the first sub-jaw having a first tier top surface located between the first tier compression gripping surface and the first tier expansion gripping surface and extending parallel with the first sub-jaw bottom surface; and
   wherein the second tier compression gripping surface and the second tier expansion gripping surface each are positioned at a dovetail taper to the first tier top surface such that a third angle measured between the first tier top surface and the second tier compression gripping surface is less than ninety degrees and a fourth angle measured between the first tier top surface and the second tier expansion gripping surface is less than ninety degrees.

18. The multiple pivoted lathe chuck jaw assembly of claim 13, further comprising:
   the first sub-jaw having a sub-jaw bottom surface located between the first tier compression gripping surface and the first tier expansion gripping surface and resting upon the front face of the baseplate; and
   wherein the sub-jaw bottom surface having a blind attachment hole located in the center of the sub-jaw bottom surface that aligns with the first pivoting attachment point on the baseplate and assists in pivotably attaching the first sub-jaw to the baseplate.

19. The multiple pivoted lathe chuck jaw assembly of claim 18, further comprising:
   a pivot screw extending from the front face of the baseplate and into the blind attachment hole in the first sub-jaw, thereby pivotably attaching the first sub-jaw to the baseplate.

20. The multiple pivoted lathe chuck jaw assembly of claim 19, wherein the first tier compression gripping surface and the first tier expansion gripping surface each are positioned at a dovetail taper to the front face such that a first angle measured between the front face and the first tier compression gripping surface is less than ninety degrees and a second angle measured between the front face and the first tier expansion gripping surface is less than ninety degrees.

21. The multiple pivoted lathe chuck jaw assembly of claim 18, further comprising:
   the first tier of the first sub-jaw having a first tier top surface located between the first tier compression gripping surface and the first tier expansion gripping surface and extending parallel with the first sub-jaw bottom surface; and
   wherein the second tier compression gripping surface and the second tier expansion gripping surface each are positioned at a dovetail taper to the first tier top surface such that a third angle measured between the first tier top surface and the second tier compression gripping surface is less than ninety degrees and a fourth angle measured between the first tier top surface and the second tier expansion gripping surface is less than ninety degrees.

22. The multiple pivoted lathe chuck jaw assembly of claim 13, wherein the first tier compression gripping surface and the first tier expansion gripping surface each are positioned at a dovetail taper to the front face such that a first angle measured between the front face and the first tier compression gripping surface is less than ninety degrees and a second angle measured between the front face and the first tier expansion gripping surface is less than ninety degrees.

23. The multiple pivoted lathe chuck jaw assembly of claim 13 wherein the first and second sub-jaws are made from a material selected from the following: metal, ceramic, and nylon.

24. The multiple pivoted lathe chuck jaw assembly of claim 23 wherein the first and second sub-jaws are made from a material selected from the following: metal, ceramic, and nylon.

25. A multiple pivoted lathe chuck jaw assembly configured to be mounted on a lathe chuck, the lathe chuck having a central axis and a radially movable element that can be adjusted inwards and outwards from the central axis, the multiple pivoted lathe chuck jaw assembly comprising:
   a baseplate having a front face, a rear face, a left edge, and a right edge;
   a jaw assembly attachment on the rear face of the baseplate that attaches the baseplate to one of the radially moveable elements on the lathe chuck such that the baseplate is positioned perpendicular to the central axis of the lathe chuck and is radially movable inwards and outwards from the central axis in response to adjustment of the radially movable element;
   wherein, when the radially movable element is adjusted maximally inwards, the baseplate is at a minimum expansion point, when the radially movable element is adjusted maximally outwards, the baseplate is at a maximum expansion point, and when the radially movable element is adjusted midway between maximally inwards and maximally outwards, the baseplate is at a midway expansion point;
   a first pivoting attachment point on the front face and a second pivoting attachment point on the front face, the first and second pivoting attachment points are located along a pivoting attachment point arc defined by a pivoting attachment point radius measured from the central axis and extending from the left edge to the right edge;
   a first sub-jaw pivotably attached to the front face of the baseplate at the first pivoting attachment point and a second sub-jaw pivotably attached to the front face of the baseplate at the second pivoting attachment point;

the first sub-jaw having a first tier and a second tier wherein the first tier is positioned above the front face of the baseplate and the second tier is positioned above the first tier;

the first tier having a first tier compression gripping surface located along a first tier compression gripping surface arc defined by a first inner radius measured from the central axis, and a first tier expansion gripping surface located along a first tier expansion gripping surface arc defined by a first outer radius measured from the central axis;

the second tier having a second tier compression gripping surface located along a second tier compression gripping surface arc defined by a second inner radius measured from the central axis, and a second tier expansion gripping surface located along a second tier expansion gripping surface arc defined by a second outer radius measured from the central axis;

a plurality of force-directed serrations on at least one of: the first tier compression gripping surface, the first tier expansion gripping surface, the second tier compression gripping surface, and the second tier expansion gripping surface;

the plurality of force-directed serrations each having a vertical extension tooth wall and an angled tooth wall;

the vertical extension tooth wall extending outwards from the gripping surface, approximately parallel to the front face, and terminating at a serration point;

the angled tooth wall extending outwards from the gripping surface at an angle of less than ninety degrees measured from the front face and also terminating at the serration point;

the first sub-jaw having a sub-jaw bottom surface located between the first tier compression gripping surface and the first tier expansion gripping surface and resting upon the front face of the baseplate;

the first tier of the first sub-jaw having a first tier top surface located between the first tier compression gripping surface and the first tier expansion gripping surface and extending parallel with the first sub-jaw bottom surface;

the first tier compression gripping surface and the first tier expansion gripping surface each are positioned at a dovetail taper to the front face such that a first angle measured between the front face and the first tier compression gripping surface is less than ninety degrees and a second angle measured between the front face and the first tier expansion gripping surface is less than ninety degrees;

the second tier compression gripping surface and the second tier expansion gripping surface each are positioned at a dovetail taper to the first tier top surface such that a third angle measured between the first tier top surface and the second tier compression gripping surface is less than ninety degrees and a fourth angle measured between the first tier top surface and the second tier expansion gripping surface is less than ninety degrees;

wherein, when the baseplate is at the midway expansion point, the first inner radius matches a radius from the first tier compression gripping surface arc to the central axis such that a first workpiece being compressed by the first sub-jaw would have a workpiece radius that corresponds to the radius from the first tier compression gripping surface arc to the central axis, causing the first tier compression gripping surface to have maximum surface area contact with the first workpiece;

wherein, when the baseplate is at the midway expansion point, the second outer radius matches a radius from the second tier expansion gripping surface arc to the central axis such that a second workpiece being expanded by the first sub-jaw would have a workpiece inner radius that corresponds to the radius from the second tier expansion gripping surface arc to the central axis, causing the second tier expansion gripping surface to have maximum surface area contact with the second workpiece;

wherein, when the baseplate is at the maximum expansion point, the second inner radius matches a radius from the second tier compression gripping surface arc to the central axis such that a third workpiece being compressed by the first sub-jaw would have a workpiece radius that corresponds to the radius from the second tier compression gripping surface arc to the central axis, causing the second tier compression gripping surface to have maximum surface area contact with the third workpiece; and wherein, when the baseplate is at the maximum expansion point, the first outer radius matches a radius from the first tier expansion gripping surface arc to the central axis such that a fourth workpiece being expanded by the first sub-jaw would have a workpiece inner radius that corresponds to the radius from the first tier expansion gripping surface arc to the central axis, causing the first tier expansion gripping surface to have maximum surface area contact with the fourth workpiece.

26. The multiple pivoted lathe chuck jaw assembly of claim 25, wherein the first pivoting attachment point is located along the pivoting attachment point arc one quarter of the length of the arc from the left edge, and the second pivoting attachment point is located along the pivoting attachment point arc one quarter of the length of the arc from the right edge.

27. The multiple pivoted lathe chuck jaw assembly of claim 26, wherein the sub-jaw bottom surface having a blind attachment hole located in the center of the sub-jaw bottom surface that aligns with the first pivoting attachment point on the baseplate and assists in pivotably attaching the first sub-jaw to the baseplate.

28. The multiple pivoted lathe chuck jaw assembly of claim 27, further comprising:
a pivot screw extending from the front face of the baseplate and into the blind attachment hole in the first sub-jaw, thereby pivotably attaching the first sub-jaw to the baseplate.

29. The multiple pivoted lathe chuck jaw assembly of claim 28 wherein the first and second sub-jaws are made from a material selected from the following: metal, ceramic, and nylon.

30. The multiple pivoted lathe chuck jaw assembly of claim 25 wherein the sub-jaw bottom surface having a blind attachment hole located in the center of the sub-jaw bottom surface that aligns with the first pivoting attachment point on the baseplate and assists in pivotably attaching the first sub-jaw to the baseplate.

31. The multiple pivoted lathe chuck jaw assembly of claim 30, further comprising:
a pivot screw extending from the front face of the baseplate and into the blind attachment hole in the first sub-jaw, thereby pivotably attaching the first sub-jaw to the baseplate.

* * * * *